United States Patent
Sato et al.

(10) Patent No.: US 12,403,399 B2
(45) Date of Patent: *Sep. 2, 2025

(54) STORAGE MEDIUM, INFORMATION PROCESSING APPARATUS, INFORMATION PROCESSING SYSTEM, AND GAME PROCESSING METHOD

(71) Applicant: NINTENDO CO., LTD., Kyoto (JP)

(72) Inventors: Haruki Sato, Kyoto (JP); Atsushi Asakura, Kyoto (JP); Katsuhisa Sato, Kyoto (JP); Yuya Sato, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/602,248

(22) Filed: Mar. 12, 2024

(65) Prior Publication Data

US 2024/0216813 A1  Jul. 4, 2024

Related U.S. Application Data

(63) Continuation of application No. 17/330,634, filed on May 26, 2021, now Pat. No. 11,964,207.

(30) Foreign Application Priority Data

Jun. 2, 2020  (JP) ................................ 2020-096009

(51) Int. Cl.
A63F 13/56 (2014.01)
A63F 13/60 (2014.01)

(52) U.S. Cl.
CPC .............. *A63F 13/56* (2014.09); *A63F 13/60* (2014.09)

(58) Field of Classification Search
CPC .................................. A63F 13/56; A63F 13/60
See application file for complete search history.

(56) References Cited

U.S. PATENT DOCUMENTS

| 2002/0198047 | A1  | 12/2002 | Hinami |
|---|---|---|---|
| 2006/0172787 | A1* | 8/2006 | Ellis ........................ A63F 13/31 463/41 |
| 2018/0253891 | A1* | 9/2018 | Dohta ................... A63F 13/577 |

FOREIGN PATENT DOCUMENTS

| JP | 10-156042 | 6/1998 |
|---|---|---|
| JP | 2019-195399 | 11/2019 |

OTHER PUBLICATIONS

"The Legend of Zelda Breath of the Wild", [online] Nintendo Co., Ltd, [searched on Apr. 21, 2020], internet <https://www.nintendo.co.jp/zelda/index.html>and its English page of https://www.nintendo.com/games/detail/the-legend-of-zelda-breath-of-the-wild-switch, 9 pages.

(Continued)

*Primary Examiner* — Thomas H Henry
(74) *Attorney, Agent, or Firm* — Nixon & Vanderhye PC

(57) ABSTRACT

An example of an information processing apparatus performs, in a virtual space including at least a player character and a terrain object, a control of moving the player character on the terrain object, based on an operation input performed by a player. If it is at least satisfied that the terrain object serving as a ceiling is present above the player character and that a destination, on the terrain object, at which the player character is placeable is present above the ceiling located above the player character, the information processing apparatus moves the player character to the destination, based on an operation input performed by the player.

28 Claims, 21 Drawing Sheets

(56) References Cited

OTHER PUBLICATIONS

Notice of Reasons for Refusal issued on Feb. 16, 2024 for Japanese Patent Application No. 2020-096009 (with translation).
[SuperMario maker2] Yamamura exercise hall—tips on producing courses (beginners/ class), YouTube [online] [video], Sep. 19, 2019, YouTube https://www.youtube.com/watch?v=nkIKZUgNFEAS, (see e.g. 25:10-25:40), [searched on Feb. 14, 2024].
Watanabe Satoshi, SuperMario maker for Nintendo 3DS perfect guide, the $1^{st}$ edition, Kadokawa Corrporation, Dec. 22, 2016, pp. 23-24.

\* cited by examiner

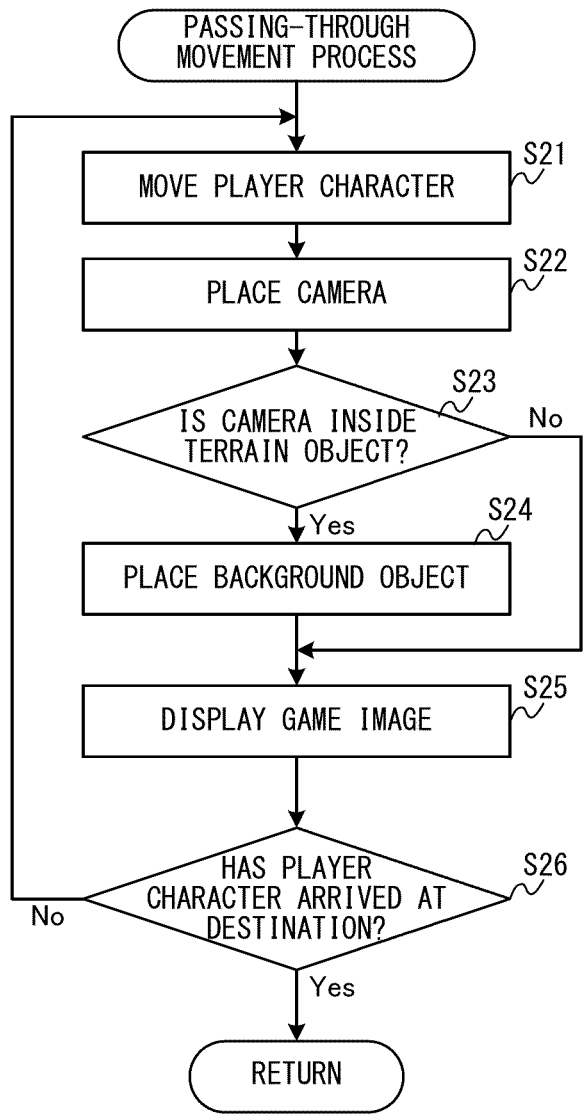

STORAGE MEDIUM, INFORMATION PROCESSING APPARATUS, INFORMATION PROCESSING SYSTEM, AND GAME PROCESSING METHOD

CROSS REFERENCE TO RELATED APPLICATION

This is a continuation of U.S. application Ser. No. 17/330,634 filed on May 26, 2021 the entire contents of which are incorporated herein by reference. This application also claims priority to Japanese Patent Application No. 2020-96009, filed on Jun. 2, 2020, the entire contents of which are incorporated herein by reference.

FIELD

The technique shown here relates to a storage medium, an information processing apparatus, an information processing system, and a game processing method for controlling movement of a player character.

BACKGROUND AND SUMMARY

Conventionally, the motion of a player character is controlled to make the player character jump high in a virtual game space.

Although the player character can be made to jump high, if a terrain object is present above the player character, it is not possible to move the player character to an upper side of the terrain object.

Therefore, the present application discloses a storage medium, an information processing apparatus, an information processing system, and a game processing method which are capable of, when a terrain object is present above a player character, moving the player character to an upper side of the terrain object.

(1) An example of a non-transitory computer-readable storage medium stores a game program to be executed by a processor in an information processing apparatus. The program causes the processor to execute: performing a normal movement control including at least a control of, in a virtual space including at least a player character and a terrain object, moving the player character on the terrain object, based on an operation input performed by a player; and performing a special movement control of moving the player character to a destination, based on an operation input performed by the player, if it is at least satisfied that the terrain object serving as a ceiling is present above the player character and that the destination, on the terrain object, at which the player character is placeable is present above the ceiling located above the player character.

According to the configuration of the above (1), when the terrain object is located above the player character, the player character can be moved to an upper side of the terrain object.

(2) In the special movement control, if it is further satisfied that the terrain object serving as the ceiling is present within a predetermined distance upward from the player character, the game program may cause the processor to execute performing a control of moving the player character to the destination, based on the operation input performed by the player.

According to the configuration of the above (2), if the terrain object serving as the ceiling is far distant from the player character, it is possible to reduce the possibility that the player character is moved.

(3) In the special movement control, the game program may cause the processor to execute performing a control of moving the player character to the destination by moving the player character upward from a current position and further moving the player character so as to pass through the terrain object from the ceiling.

According to the configuration of the above (3), it is possible to allow the player to intuitively recognize that the player character passes through the terrain object when moving from the current position to the destination on the terrain object.

(4) When moving the player character to the destination by the special movement control, the game program may cause the processor to execute displaying different animations between a case where the player character moves inside the terrain object and a case where the player character moves outside the terrain object.

According to the configuration of the above (4), it is possible to allow the player to easily recognize that the player character moves in the terrain object.

(5) The game program may cause the processor to further execute: performing, according to a first instruction by an operation input performed by the player, determination as to whether or not a determination condition is satisfied, the determination condition being that a terrain object serving as a ceiling is present within a predetermined distance upward from the player character and that a destination on the terrain object is present above the ceiling located above the player character, and display of a result of the determination; and performing, in the special movement control, a control of moving the player character to the destination in response to a second instruction by an operation input performed by the player in a case where the determination condition is satisfied.

According to the configuration of the above (5), the player can confirm whether or not movement of the player character onto the terrain object is possible and thereafter perform the second instruction for causing the player character to actually move.

(6) In determining whether or not the determination condition is satisfied, determination as to whether or not a terrain object serving as a ceiling is present within the predetermined distance upward from the player character may be performed based on whether or not a determination shape, which is virtually placed, has a predetermined height, and extends upward from the position of the player character, is in contact with the terrain object.

(7) The determination shape may be at least one of a shape defined by one or more line segments extending upward, a polygonal column shape, and a cylindrical shape.

According to the configuration of the above (6) or (7), use of the determination shape facilitates the determination.

(8) The determination as to whether or not a terrain object serving as a ceiling is present within the predetermined distance upward from the player character may be performed based on a size of a part, of the determination shape, which is in contact with a surface of the terrain object.

According to the configuration of the above (8), it is possible to reduce the possibility of unnatural display such that a part of the player character protrudes from the terrain object when the player character passes through the terrain object.

(9) As for the determination as to whether or not a terrain object serving as a ceiling is present within the predetermined distance upward from the player character, the game program may cause the processor to further execute determining, based on a state of a part, of the terrain object, which is in contact with the determination shape, whether or not the part of the terrain object is regarded as the ceiling.

According to the configuration of the above (9), if inconvenience is likely to occur in the progress of the game when movement of the player character to the destination is allowed, the possibility of occurrence of such inconvenience can be reduced.

(10) The display showing the result of the determination may be performed by rendering at least one of: a part, of the terrain object, which is in contact with the determination shape; and a position in which the determination shape is placed, in different display modes depending on the result of the determination.

According to the configuration of the above (10), whether or not movement of the player character to the destination is possible can be notified in an easy-to-understand manner for the player.

(11) If a determination condition based on at least one of: a state of a place that is directed upward in the terrain object and is above the player character; and a size of a space that is outside the terrain object and on an upper side of the place, is further satisfied, the game program may cause the processor to execute performing the special movement control with the place being the destination, based on an operation input performed by the player.

According to the configuration of the above (11), it is possible to reduce the possibility that the player character is moved to a place where the player character cannot be placed.

This specification discloses examples of an information processing apparatus and an information processing system which execute the processes in the above (1) to (11). This specification also discloses an example of a game processing method for executing the processes in the above (1) to (11).

According to the storage medium, the information processing apparatus, the information processing system, and the game processing method, when a terrain object is present above a player character, the player character can be moved to an upper side of the terrain object.

These and other objects, features, aspects and advantages of the exemplary embodiment will become more apparent from the following detailed description when taken in conjunction with the accompanying drawings.

BRIEF DESCRIPTION OF THE DRAWINGS

FIG. 21 is a sub-flowchart showing an example of a specific flow of a passing-through movement process in step S13 shown in FIG. 20.

DETAILED DESCRIPTION OF NON-LIMITING EXAMPLE EMBODIMENTS

1. Configuration of Game System

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
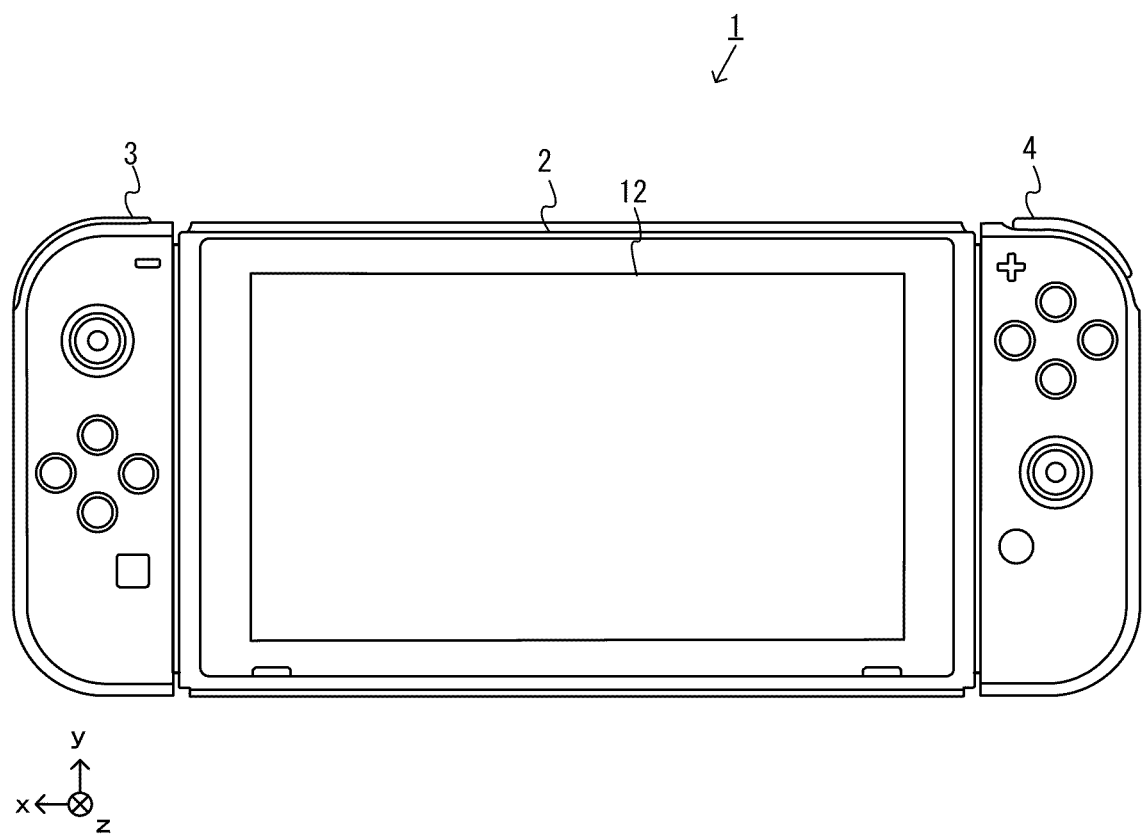
FIG. 1 is a diagram showing an example of a state where non-limiting left and right controllers are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
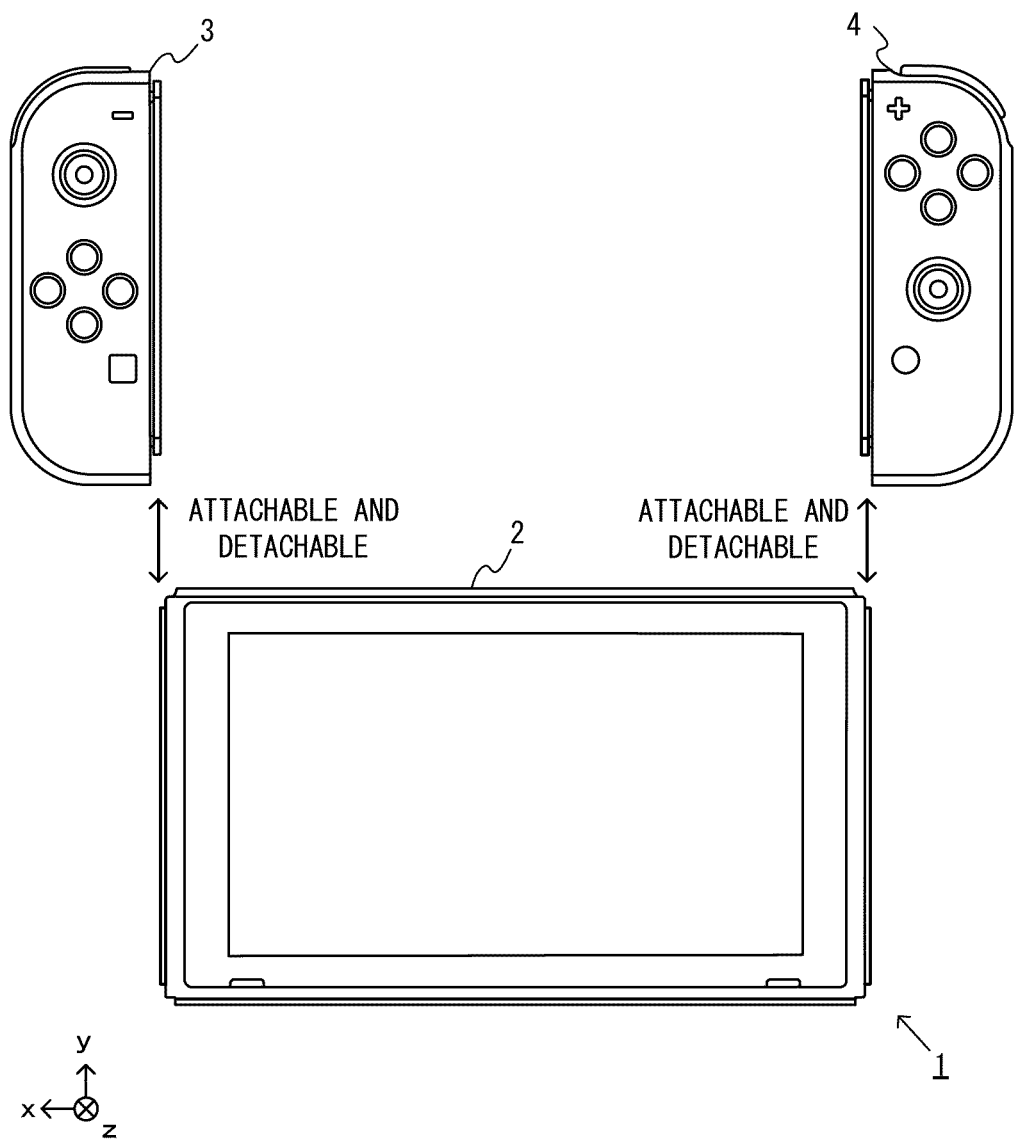
FIG. 2 is a diagram showing an example of a state where each of the non-limiting left and right controllers is detached from the non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
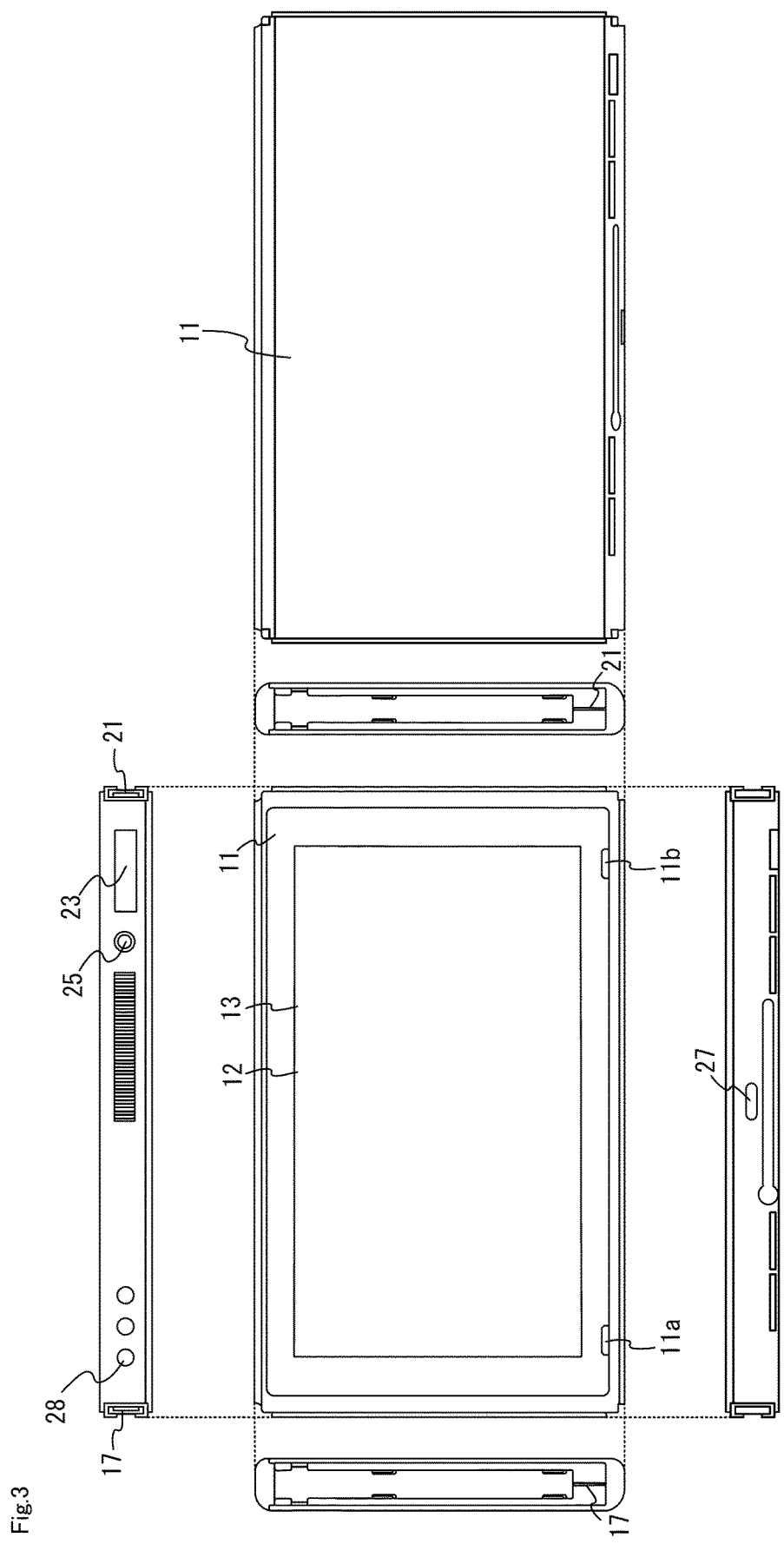
FIG. 3 is six orthogonal views showing an example of the non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
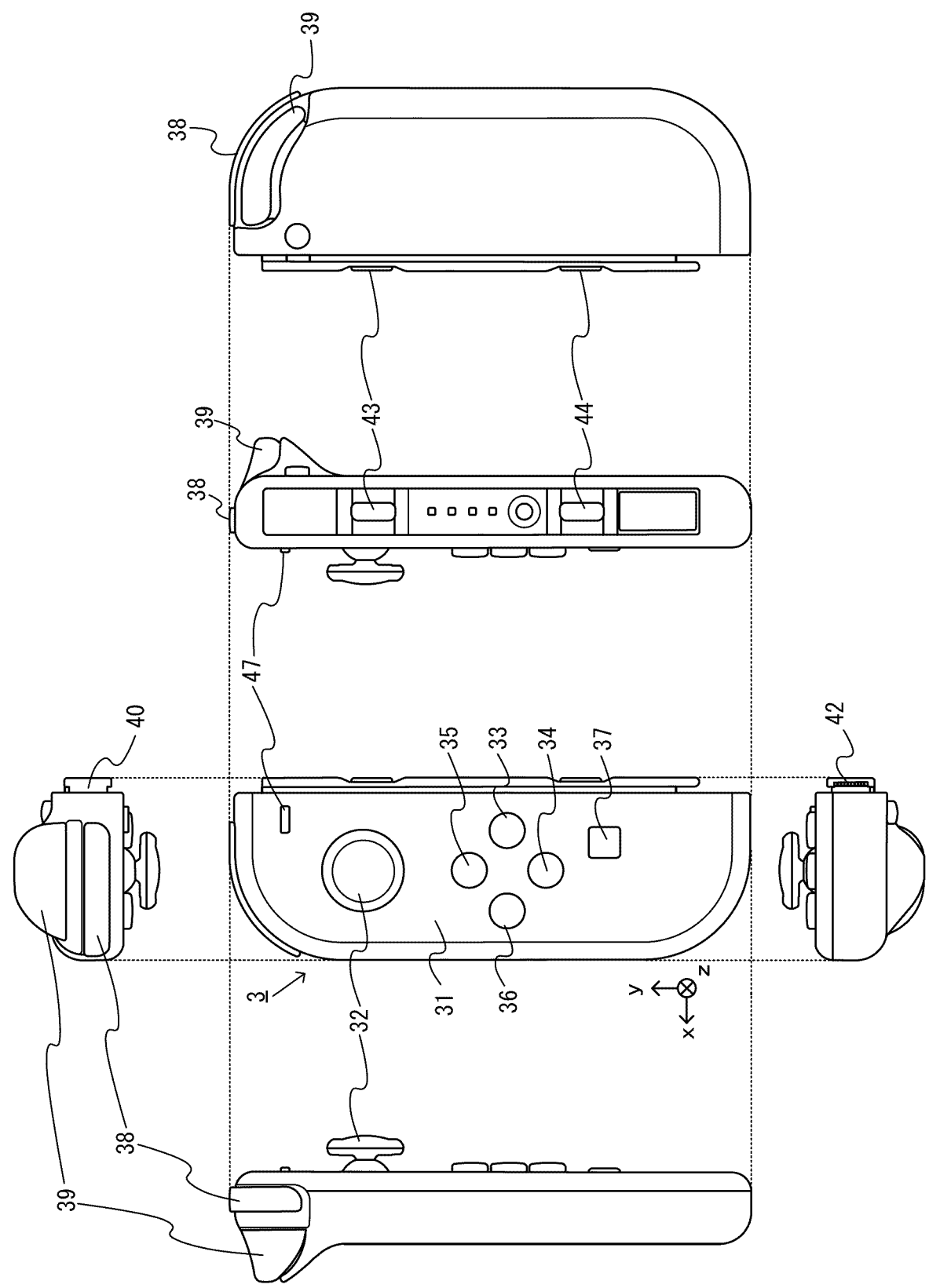
FIG. 4 is six orthogonal views showing an example of the non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
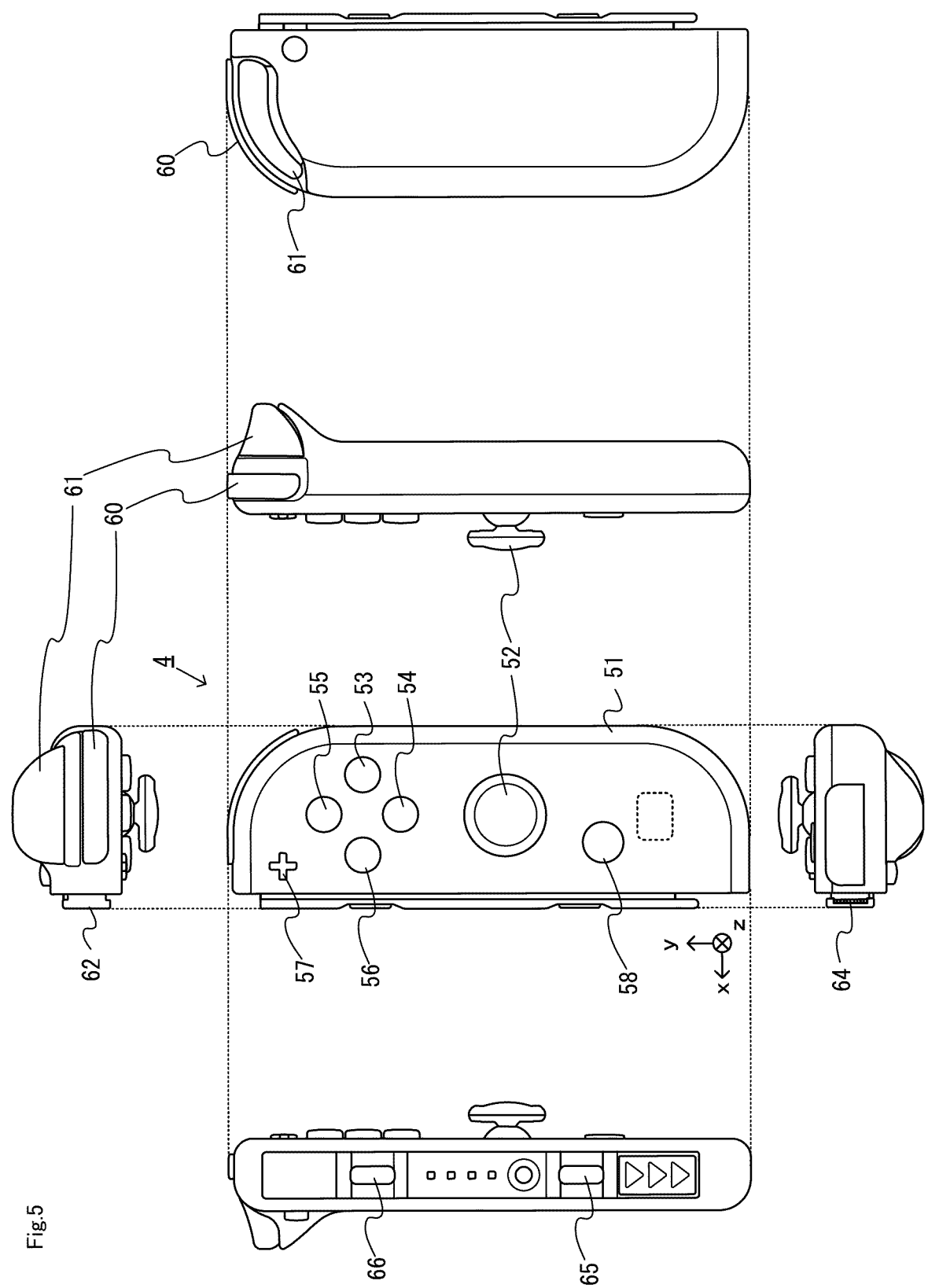
FIG. 5 is six orthogonal views showing an example of the non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
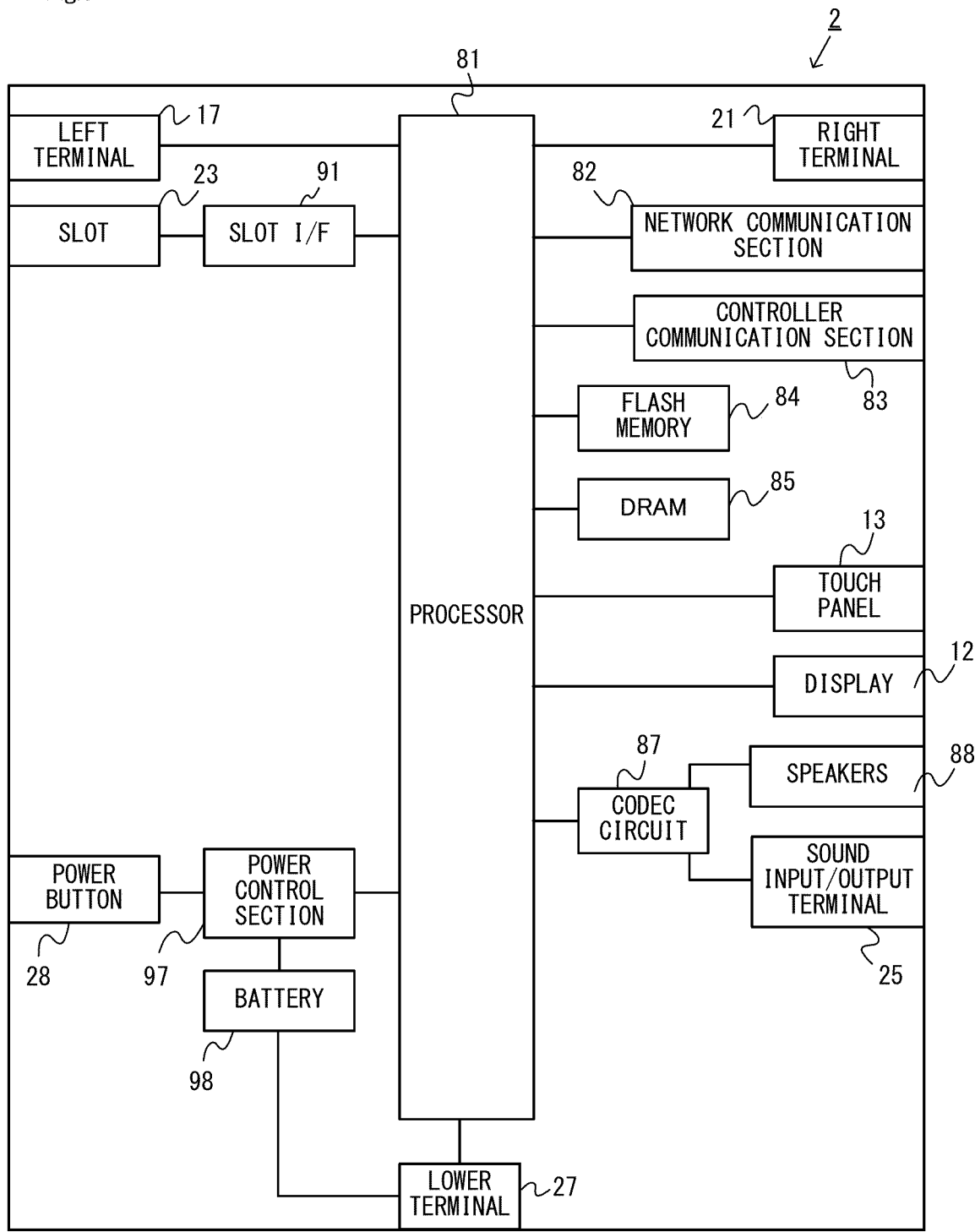
FIG. 6 is a block diagram showing an example of an internal configuration of the non-limiting main body apparatus.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
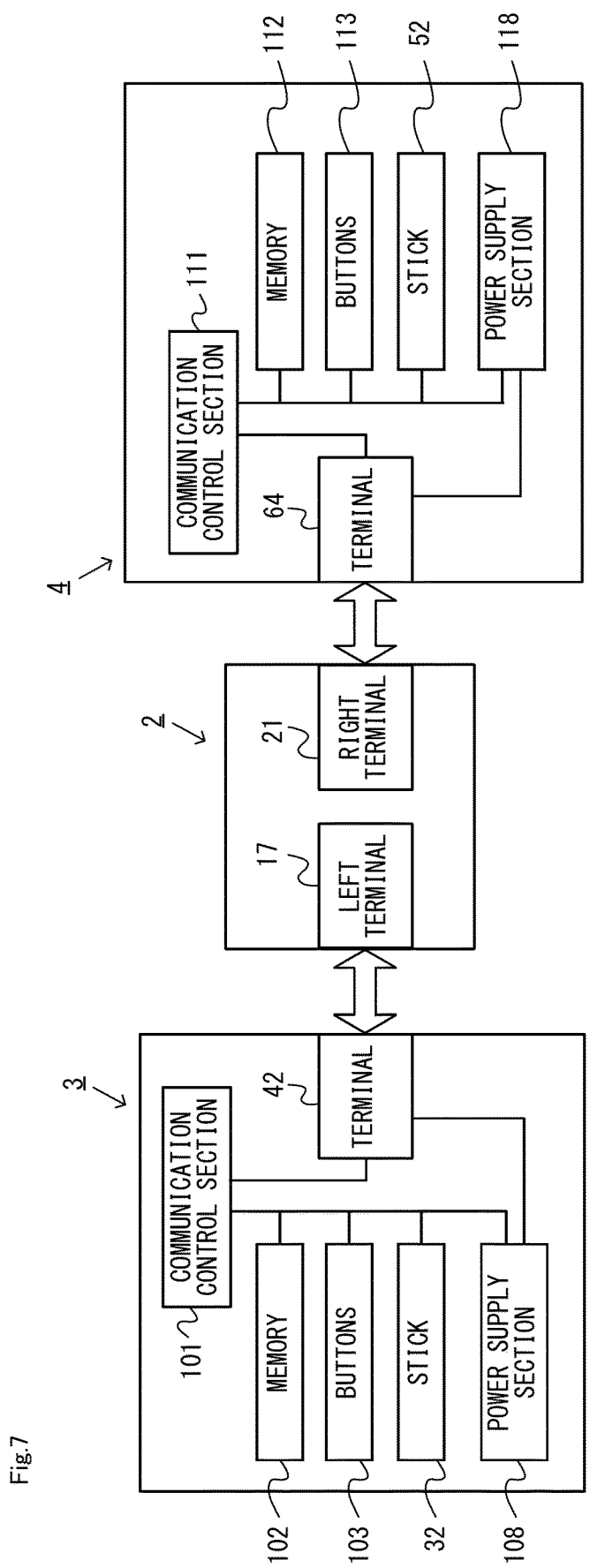
FIG. 7 is a block diagram showing examples of internal configurations of the non-limiting main body apparatus and the non-limiting left and right controllers.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103, and, the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, and, the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

2. Outline of Processing in Game System

An outline of game processing performed in a game system 1 will be described with reference to FIGS. 8 to 18. In the exemplary embodiment, in a game according to the game processing, a player character operated by a player (in other words, a user) moves in a virtual three-dimensional game space. In the game space, a terrain object (e.g., an object representing the ground, a building, or the like), an enemy object, etc., are placed in addition to the player character. The player character is allowed to move on the terrain object according to an operation performed by the player. Control for moving the player character on the terrain object may be similar to a conventional control method. In the exemplary embodiment, in addition to the movement on the terrain object, the player character is allowed to move while passing through a terrain object located above the player character (hereinafter this movement is referred to as "passing-through movement"). Hereinafter, a process for such passing-through movement will be described.

[2-1. Outline of Movement]

Figure 8:
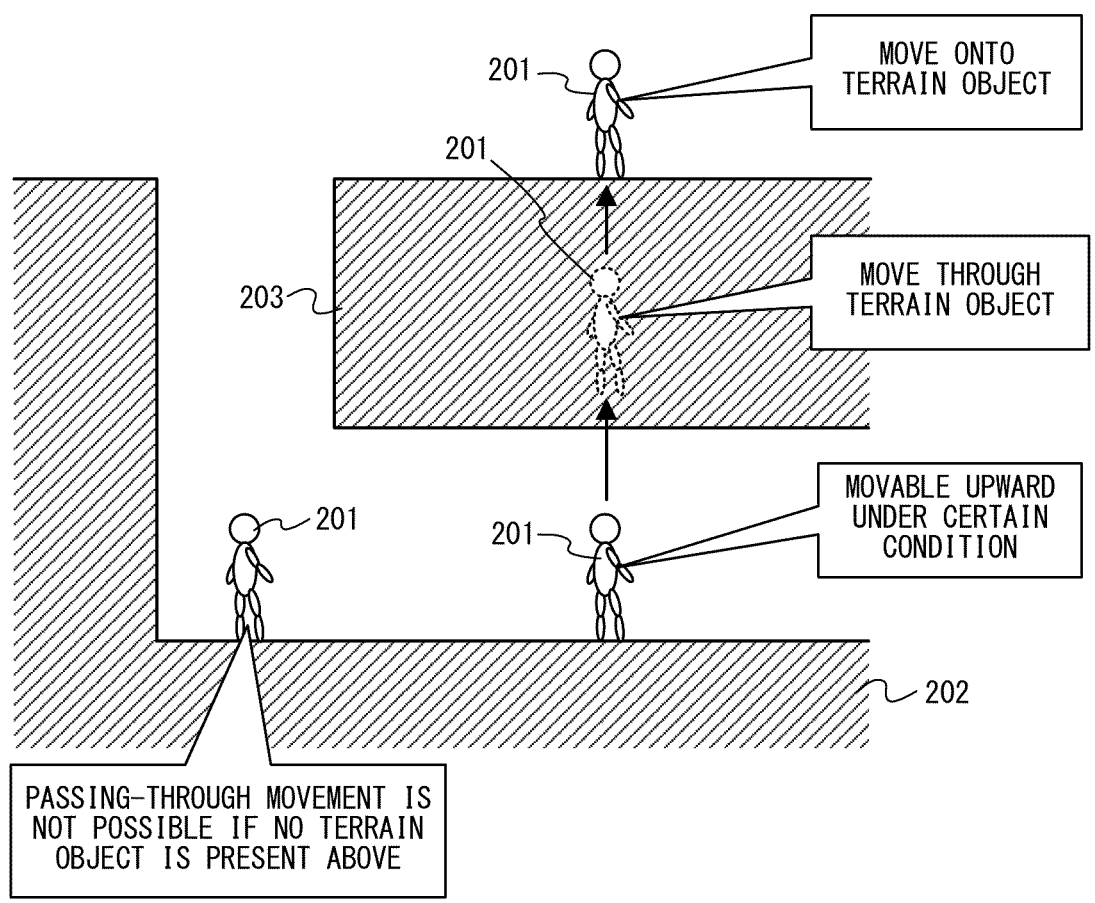
FIG. 8 is a schematic diagram showing an example of a state where a player character performs passing-through movement in a game space according to an exemplary embodiment.

FIG. 8 is a schematic diagram showing a state where a player character performs passing-through movement in a game space according to the exemplary embodiment. FIG. 8 shows the game space as seen from a direction parallel to the horizontal direction. In the game state shown in FIG. 8, a player character 201 is placed on a terrain object 202, and a terrain object 203 serving as a ceiling is present above the player character 201. In this state, the player character 201 is allowed to pass through the terrain object 203 and move onto the terrain object 203, on condition that a movement condition described later is satisfied (see FIG. 8).

In this specification, a terrain object is any object which is placed in a game space, and at least a part of which allows a player character to be placed thereon. The terrain object may represent the ground or a building in the game space. Moreover, in the exemplary embodiment, an object (e.g., an object representing a rock, a big box, or the like) placed on the terrain object representing the ground is also a kind of a terrain object. The terrain object may be an object that moves under a predetermined condition, such as a rock object that moves when a certain game condition is satisfied.

In this specification, a ceiling is not limited to a ceiling part of a building object. Apart, of any terrain object, which faces downward and allows passing-through movement can be a ceiling. For example, when a cave is formed by a terrain object representing the ground or a tunnel is formed by a terrain object representing a mountain, a part, of the terrain object, facing downward is a ceiling.

As shown in FIG. 8, when the player character performs passing-through movement, it does not mean that a hole is formed through the terrain object. When the passing-through movement according to the exemplary embodiment is performed, collision determination between the player character and the terrain object is exceptionally omitted, whereby the player character is moved while ignoring collision determination with the terrain object.

The passing-through movement is a motion different from a motion of the player character jumping up from the ground. In the exemplary embodiment, the passing-through movement is a motion performed at least on condition that a ceiling is present above the player character. If no ceiling is present above the player character, the player character does not perform the passing-through movement (see FIG. 8). In this case, the player character does not perform even a jump action. Therefore, it can be said that the passing-through movement is a motion different from a common jump action, i.e., a jump of the player character in response to an operation performed by the player. In the exemplary embodiment, the player character is allowed to perform a jump action by an operation different from that for the passing-through movement.

In the exemplary embodiment, the aforementioned passing-through movement allows the player character to move onto the terrain object located above the player character. Therefore, for example, the passing-through movement allows the player character to quickly escape from an underground cave or quickly move onto a roof from the inside of a building. Moreover, for example, when there is a cave beneath a building where the player character cannot enter because the entrance door is locked, the passing-through movement allows the player character to enter the building from the cave. Thus, the passing-through movement offers unprecedented moving methods, thereby enhancing strategic characteristics of the game.

[2-2. Movement Conditions]

Next, conditions for the player character to perform the aforementioned passing-through movement (referred to as "movement conditions") will be described. In the exemplary embodiment, the movement conditions include a ceiling condition regarding a ceiling and a destination condition regarding a destination. The passing-through movement can be performed when both the ceiling condition and the destination condition are satisfied. Hereinafter, the ceiling condition and the destination condition will be described.

[2-2-1. Ceiling Condition]

In the exemplary embodiment, the ceiling condition is a condition regarding a ceiling above a player character, and includes four conditions as follows:

a height condition regarding a height from the player character to the ceiling;

a ceiling angle condition regarding an inclination angle of the ceiling;

an area condition regarding the area of the ceiling; and an object condition regarding an object provided to the ceiling.

In the exemplary embodiment, if the above four conditions are satisfied, the game system 1 determines that the ceiling condition is satisfied (i.e., there is a ceiling that allows passing-through movement). If at least one of the four conditions is not satisfied, the game system 1 determines that the ceiling condition is not satisfied. In another embodiment, the ceiling condition may not necessarily include all the four conditions, and may include at least one of the four conditions. Alternatively, the ceiling condition may include a condition different from the four conditions.

Figure 9:
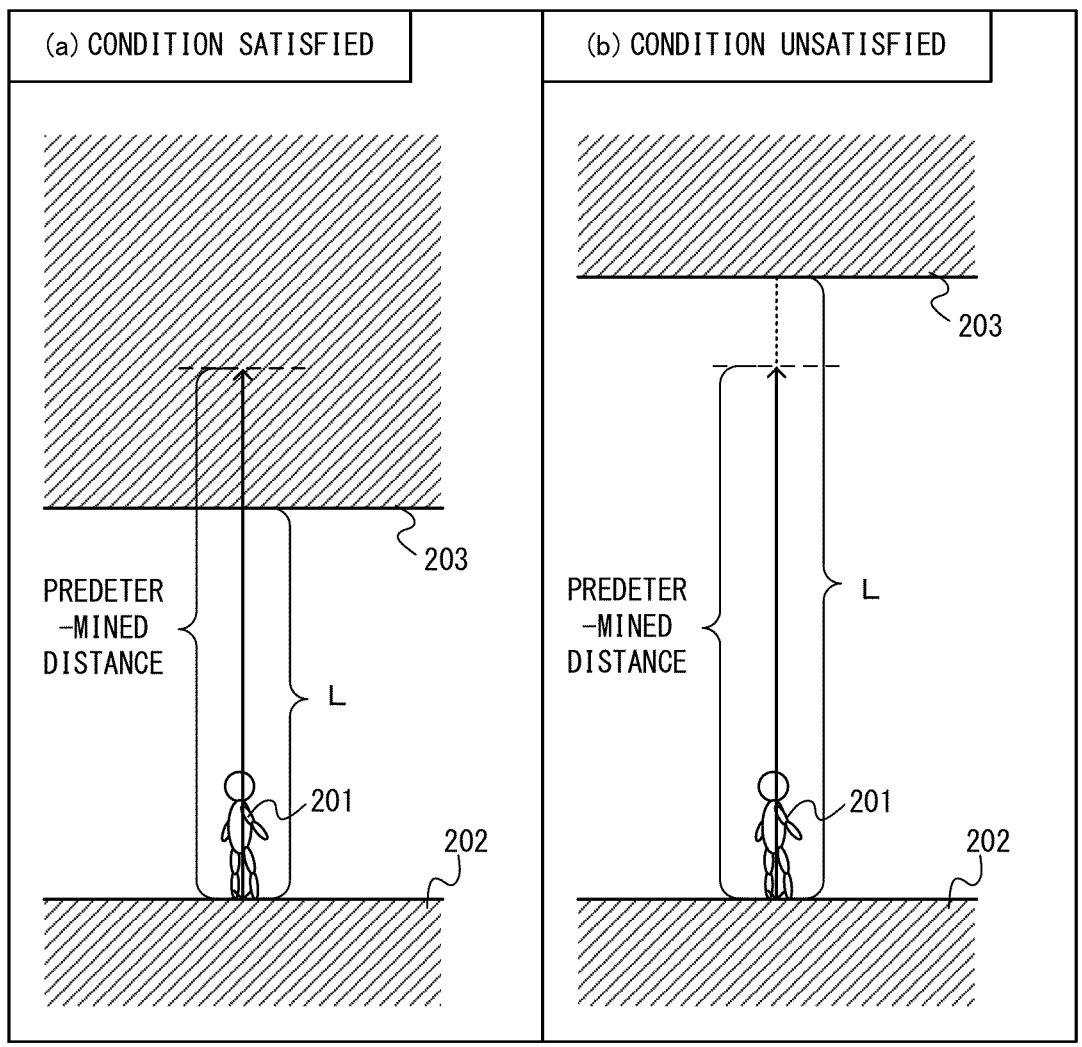
FIG. 9 shows an example of cases where a height condition is satisfied and where it is not satisfied.

FIG. 9 shows an example of cases where the height condition is satisfied and where it is not satisfied. In the exemplary embodiment, the height condition is that the distance from the position of the player character 201 to a ceiling (i.e., the terrain object 203 serving as the ceiling) is within a predetermined distance. The game system 1 determines the height condition, based on a distance (referred to as "ceiling distance") L from the player character 201 to the ceiling. That is, if the ceiling distance L is within the predetermined distance, the height condition is satisfied (see (a) of FIG. 9). Meanwhile, if the ceiling distance L is longer than the predetermined distance, the height condition is not satisfied (see (b) of FIG. 9).

Figure 10:
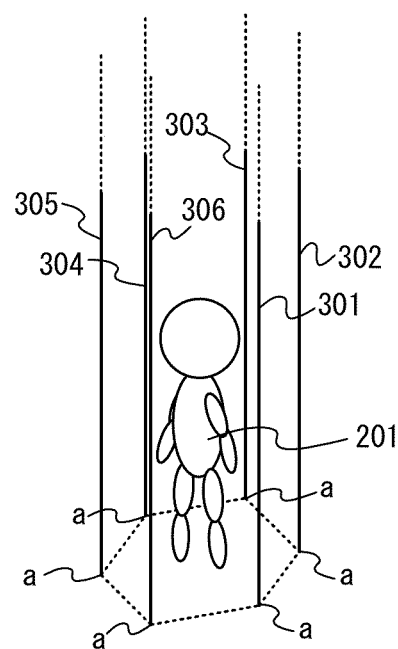
FIG. 10 shows an example of rays set around the player character.

A method for calculating the ceiling distance L is arbitrary, and the exemplary embodiment adopts the following method, for example. That is, the ceiling distance L is calculated by using straight lines (referred to as "rays") that are set based on the position of the player character. FIG. 10 shows an example of rays set around a player character. As shown in FIG. 10, the game system 1 virtually places, in the game space, rays 301 to 306 extending upward from a start point a, around the player character 201. In the exemplary embodiment, six rays 301 to 306 are set. That is, in the exemplary embodiment, it can also be said that a hexagonal column having a player character inside is virtually placed. In another embodiment, the number of rays to be set may be any number not less than 1.

In the exemplary embodiment, the six rays 301 to 306 are located at the vertices of a hexagon centering around the position of the player character 201 as seen from above the game space (see FIG. 10). However, rays may be arranged at any positions around the player character 201. The start points a of the respective rays 301 to 306 are set at positions near the feet of the player character 201 (specifically, positions at the lower end of the player character 201) with respect to the up-down direction (see FIG. 10). Even when the terrain object on which the player character 201 is placed has irregularities or a slope, the start points a of the respective rays 301 to 306 are set at the same height with respect to the up-down direction. The positions of the start points with respect to the up-down direction may be any positions that depend on the position of the player character 201 in the up-down direction. In another embodiment, the positions of the start points with respect to the up-down direction may be set at the position of the head of the player character 201, for example.

The game system 1 calculates, for each ray, a length from the start point a of the ray to a position where the ray is in contact with the ceiling (referred to as "contact point"). Then, the game system 1 calculates a ceiling distance L, based on the lengths from the start points a to the contact points of the respective rays 301 to 306. For example, the ceiling distance L may be calculated as an average value of the lengths from the start points to the contact points of the six rays 301 to 306 (however, rays not in contact with the ceiling are excluded). Based on the plurality of rays, the ceiling distance L can be calculated with high accuracy even if the ceiling has irregularities or a slope.

As described above, in the exemplary embodiment, the game system 1 sets the height condition, and causes the player character to perform passing-through movement, on condition that the distance (e.g., the ceiling distance L) from the player character to the ceiling satisfied the height condition. That is, the game system 1 causes the player character to perform passing-through movement if it is satisfied that the terrain object serving as the ceiling is present within the predetermined distance upward from the player character. In this case, even when the terrain object is present above the player character, if the terrain object is too far apart from the player character, passing-through movement to the terrain object can be inhibited. For example, it is assumed that a terrain object is present far above the ground, and the terrain object is a place where the player character would reach after the game is progressed. In this case, if passing-through movement to this place is allowed, inconvenience may occur in the progress of the game. However, according to the exemplary embodiment, since the height condition is set, the possibility of such inconvenience can be reduced.

Moreover, as described above, in the exemplary embodiment, it can also be said that determination of the height condition (i.e., determination as to whether or not a terrain object serving as a ceiling is present within the predetermined distance upward from the player character) is performed based on whether or not a virtually placed determination shape, which has a predetermined height and extends upward from the position of the player character, is in contact with the terrain object. The determination shape according to the exemplary embodiment is a shape defined by the six rays 301 to 306, and can be regarded as a hexagonal column in which the six rays 301 to 306 correspond to the sides of the side faces thereof. The height of this hexagonal column is equal to the predetermined distance that is a threshold value for the height condition. In another embodiment, the determination shape may be any columnar shape, such as a polygonal column other than a hexagonal column, or a cylindrical shape. As described above, determination of the height condition can be easily performed by using the determination shape. Although described later in detail, the determination shape (specifically, the rays 301 to 306) is also used for determinations regarding the ceiling angle condition, the area condition, and the object condition. Use of the determination shape facilitates the determinations regarding these conditions, as in the case of the height condition.

Figure 11:
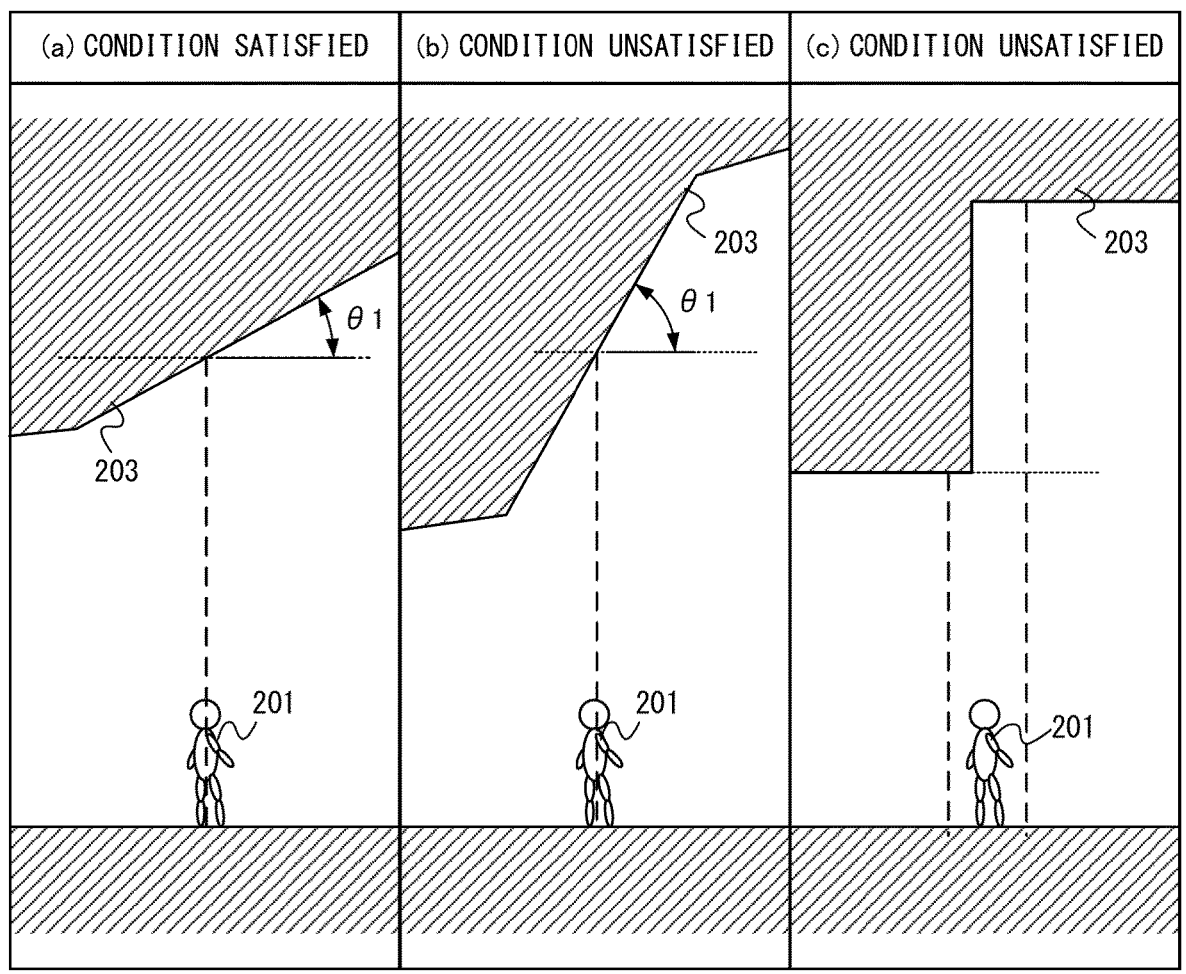
FIG. 11 shows an example of cases where a ceiling angle condition is satisfied and where it is not satisfied.

FIG. 11 shows an example of cases where the ceiling angle condition is satisfied and where it is not satisfied. In the exemplary embodiment, the ceiling angle condition is that an inclination angle of a ceiling located above the player character 201 is within a predetermined angle. Specifically, the inclination angle is an inclination angle θ1, with respect to the horizontal direction, of the terrain object 203 serving as the ceiling (see FIG. 11).

The game system 1 determines the ceiling angle condition, based on the inclination angle θ1. That is, if the inclination angle θ1 is smaller than or equal to a predetermined angle (e.g., 50°), the ceiling angle condition is satisfied (see (a) of FIG. 11). Meanwhile, if the inclination angle θ1 is greater than the predetermined angle, the ceiling angle condition is not satisfied (see (b) of FIG. 11). Thus, when the inclination angle θ1 is great, the part, of the terrain object 203, located above the player character 201 is regarded as a wall rather than a ceiling, and therefore, passing-through movement is not performed.

A method for calculating the inclination angle θ1 is arbitrary, and the exemplary embodiment adopts the following method, for example. That is, in the exemplary embodiment, the inclination angle θ1 is calculated by using the aforementioned rays. Specifically, the game system 1 calculates, for each ray, an inclination angle of the terrain object 203 at the contact point where the ray is in contact with the ceiling. Then, the game system 1 calculates the inclination angle θ1 as an average value of the inclination angles calculated for the respective rays. According to this method, the inclination angle can be calculated with high accuracy even when the ceiling has irregularities.

As for the ceiling angle condition, the following determination method may be adopted instead of or in addition to the above determination method. Firstly, the game system 1 calculates the heights of the contact points for the respective rays 301 to 306. Next, the game system 1 calculates an angle (specifically, an angle with respect to the horizontal direction) of a plane that passes any three contact points. In the exemplary embodiment, the game system 1 calculates the angle of the plane for each combination of the three contact points, and determines that the ceiling angle condition is not satisfied if the angle of any plane is greater than a reference angle. According to this method, for example, if the ceiling located above the player character 201 has a step larger than a predetermined reference size, it is determined that the ceiling angle condition is not satisfied (see (c) of FIG. 11). Therefore, if passing-through movement needs to be prevented from being performed when the ceiling has such a step, the game system 1 may determine the ceiling angle condition by the above method.

As described above, based on the state of the terrain object (e.g., the inclination angle of the ceiling, a step in the ceiling, the placement state of a prohibited object described later, or the like) at a part in contact with the determination shape (e.g., a hexagonal column defined by the six rays 301 to 306), the game system 1 determines whether or not the part of the terrain object is regarded as a ceiling. Thus, it is possible to reduce the possibility of passing-through movement to be performed at a part having a steep slope that cannot be regarded as a ceiling, or a part having a large step. Moreover, it is possible to reduce the possibility that inconvenience occurs in the progress of the game due to passing-through movement performed in a place where passing-through movement is not intended by a game creator.

Figure 12:
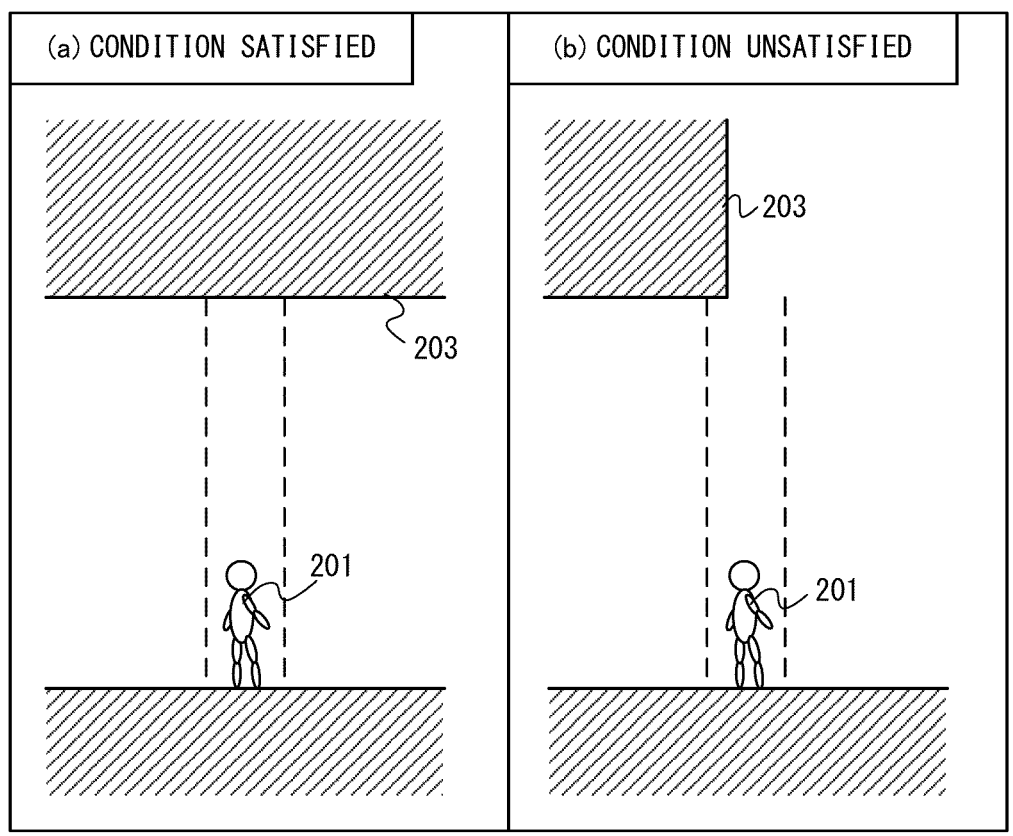
FIG. 12 shows an example of cases where an area condition is satisfied and where it is not satisfied.

FIG. 12 shows an example of cases where the area condition is satisfied and where it is not satisfied. In the exemplary embodiment, the area condition is that a projection area on a ceiling located above the player character 201 is larger than or equal to a predetermined quantity. Specifically, when a planar region that intersects the player character 201 and is parallel to the horizontal direction (specifically, a hexagonal region having, as vertices, the start points of the six rays 301 to 306) is upwardly projected onto the ceiling, the projection area is an area of the region projected onto the ceiling.

The game system 1 determines the area condition, based on the projection area. That is, if the projection area is larger than or equal to a predetermined quantity (e.g., ⅔ of the area of the hexagonal region), the area condition is satisfied (see (a) of FIG. 12). Meanwhile, if the projection area is smaller than the predetermined quantity, the area condition is not satisfied. For example, as shown in (b) of FIG. 12, if only a part of the planar region is projected onto the ceiling of the terrain object 203, the projection area is small and therefore the area condition is not satisfied. Thus, when the projection area is small, the game system 1 determines that the part, of the terrain object 203, located above the player character 201 is not a ceiling that allows passing-through movement, and does not cause the player character 201 to perform passing-through movement.

A method for calculating the projection area is arbitrary, and the exemplary embodiment adopts the following method, for example. That is, in the exemplary embodiment, when a hexagonal region formed by line segments connecting the start points of the rays 301 to 306 is upwardly projected onto the ceiling, the game system 1 calculates, as the projection area, an area of the projected region. In another embodiment, the game system 1 may calculate a rough value of a projection area, based on the number of rays that are in contact with the terrain object 203 serving as the ceiling among the six rays 301 to 306. At this time, determination of the area condition may be performed based on whether or not the number of rays in contact with the terrain object 203 is larger than or equal to a predetermined number (e.g., 4).

As described above, in the exemplary embodiment, determination as to whether or not a terrain object serving as a ceiling is present within the predetermined distance upward from the player character, includes determination of the area condition. That is, determination as to whether or not a terrain object serving as a ceiling is present within the predetermined distance upward from the player character, is performed based on the size of a part, of the determination shape, which is in contact with the surface of the terrain object (e.g., based on the projection area). If the player character is allowed to perform passing-through movement even though the projection area is small, there is a possibility of unnatural display such that, when the player character moves while passing through the terrain object, a part of the player character protrudes from the terrain object. In contrast, according to the exemplary embodiment, use of the area condition can reduce the possibility of such unnatural display.

Figure 13:
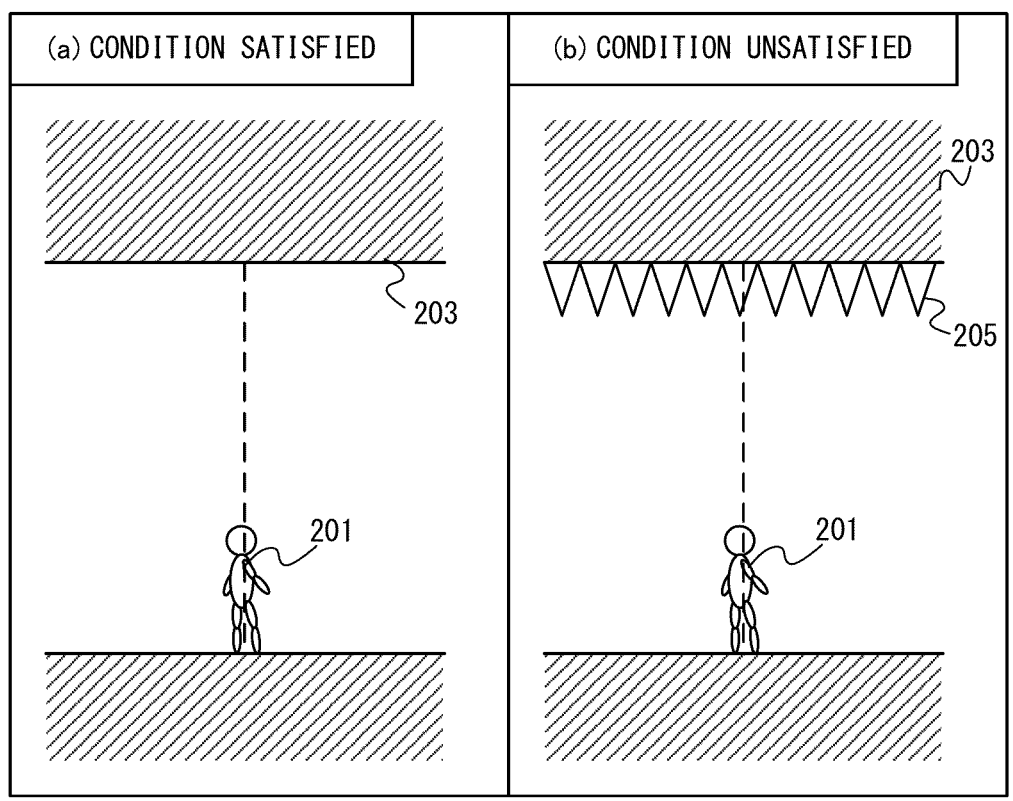
FIG. 13 shows an example of cases where an object condition is satisfied and where it is not satisfied.

FIG. 13 shows an example of cases where the object condition is satisfied and where it is not satisfied. In the exemplary embodiment, the object condition is that a prohibited object 205 is not disposed on the terrain object 203 serving as a ceiling. Here, the prohibited object 205 is a specific object defined in the game program, for example, an object with spines (see FIG. 13).

The game system 1 determines whether or not a prohibited object 205 is disposed on the ceiling above the player character 201. Specifically, the game system 1 determines the object condition, based on whether or not the rays 301 to 306 are in contact with the prohibited object 205. That is, if none of the rays 301 to 306 are in contact with the prohibited object 205, the object condition is satisfied (see (a) of FIG. 13). Meanwhile, if at least any of the rays 301 to 306 is in contact with the prohibited object 205, the object condition is not satisfied (see (b) of FIG. 13).

A specific method for determining whether or not a prohibited object is disposed on the ceiling above the player character 201 is arbitrary. For example, in another embodiment, the game system 1 may determine that the object condition is satisfied if the number of rays in contact with the prohibited object 205 is less than or equal to a predetermined number (e.g., 1).

When the prohibited object 205 is not disposed on the surface of the ceiling (i.e., when there is another terrain object between the player character and the prohibited object 205 above the player character), even if the prohibited object 205 is present at the leading ends of the rays upwardly extended, the game system 1 may determine that the object condition is satisfied. For example, in the state where the prohibited object 205 is disposed on the terrain object serving as the ceiling, if another object is disposed so as to cover the prohibited object 205 (e.g., if the player character 201 has moved the another object), the game system may determine that the object condition is satisfied with respect to the another object. Thus, even in a place where a prohibited object is disposed, the player can devise a way to enable the player character 201 to perform passing-through movement, by using another object. In another embodiment, when there is a prohibited object between the player character 201 and a destination, the game system 1 may determine that the object condition is not satisfied.

As described above, based on the state (e.g., the placement state of a prohibited object) of a part, of a terrain object, which is in contact with the determination shape (e.g., a hexagonal column defined by the six rays 301 to 306), the game system 1 determines whether or not this part of the terrain object is regarded as a ceiling. Thus, the game creator can easily prohibit passing-through movement of the player character, through setting of the state of the terrain object. For example, when there is a place where passing-through movement, if permitted, is likely to cause inconvenience in the progress of the game, the game creator can reduce the possibility of such inconvenience by changing the state of the terrain object in the place (by disposing a prohibited object, for example).

The phrase "the state of a terrain object" may be the state regarding the terrain object itself regardless of whether or not another object is disposed on the terrain object. The phrase "the state of a terrain object" may be, for example, the state regarding whether or not the terrain object itself is a prohibited object.

[2-2-2. Destination Condition]

Figure 14:
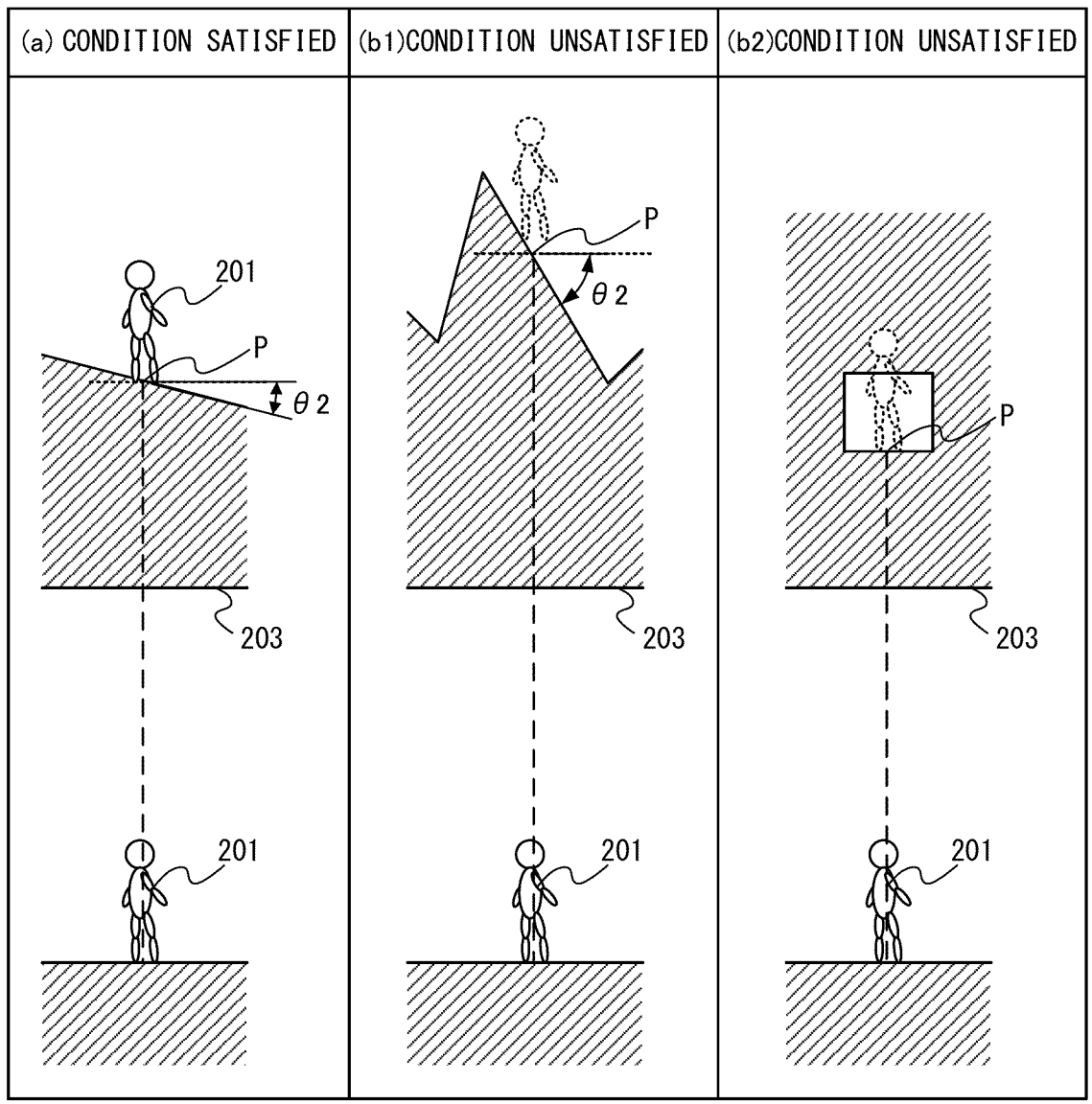
FIG. 14 shows an example of cases where a destination condition is satisfied and where it is not satisfied.

Next, the destination condition will be described. FIG. 14 shows an example of cases where the destination condition is satisfied and where it is not satisfied. The destination condition is a condition regarding a destination above the player character, and includes two conditions as follows:

a destination angle condition regarding an inclination angle of a place to be a destination; and a space condition regarding a space at the destination.

If both the two conditions are satisfied, the game system 1 determines that the destination condition is satisfied (i.e., there is a destination where the player character can be placed). If at least one of the two conditions is not satisfied, the game system 1 determines that the destination condition is not satisfied. In another embodiment, the destination condition may not necessarily include the two conditions, and may include at least one of the two conditions. The destination condition may include a condition different from the two conditions.

The destination angle condition is that an inclination angle of an upward-directed place P, which is located on an upper side of a terrain object 203 forming a ceiling above the player character 201, is within a predetermined angle. Specifically, this inclination angle is an inclination angle $\theta 2$, with respect to the horizontal direction, of the place P in the terrain object 203 (see FIG. 14). A method for calculating the inclination angle $\theta 2$ is arbitrary, and the inclination angle $\theta 2$ may be calculated by using the rays as in the case of the inclination angle $\theta 1$.

The game system 1 determines the destination angle condition, based on the inclination angle $\theta 2$. That is, if the inclination angle $\theta 2$ is smaller than or equal to a predetermined angle (e.g., 50°), the destination angle condition is satisfied (see (a) of FIG. 14). Meanwhile, if the inclination angle $\theta 2$ is greater than the predetermined angle, the ceiling angle condition is not satisfied (see (b1) of FIG. 14). Thus, when the inclination angle $\theta 2$ is great, the place P is not regarded as a destination where the player character 201 can be placed, and passing-through movement is not performed.

In the exemplary embodiment, in the state where the player character 201 is placed on a terrain object, if the inclination angle of the terrain object at the position where the player character 201 is placed is greater than or equal to a reference angle, the game system 1 control the player character 201 to move downward (e.g., to slip down) along the slope, while there is no operation performed by the player. The predetermined angle to be a threshold for the destination angle condition may be the same angle as the reference angle.

The space condition is that a space on the upper side of the place P (i.e., a space outside the terrain object) has a size (specifically, a width, a depth, and a height) that allows placement of the player character 201 therein. That is, if the space has a predetermined size enough to accommodate the player character 201, the space condition is satisfied (see (a) of FIG. 14). Meanwhile, if the space does not have the predetermined size, the space condition is not satisfied (see (b2) of FIG. 14). Thus, when the space is small, the place P is not regarded as a destination where the player character 201 can be placed, and passing-through movement is not performed.

The predetermined size is at least a size enough to avoid the player character 201 and the terrain object 203 from being in contact or overlapped with one another at somewhere other than the place P if the player character 201 is placed in the place P.

As described above, in the exemplary embodiment, when the determination condition based on at least one of: the state (e.g., the inclination angle $\theta 2$) of the upward-directed place in the terrain object and above the player character; and the size of the space outside the terrain object and on the upper side of the place, is further satisfied, the game system 1 performs control of passing-through movement with the place being a destination. Thus, it is possible to reduce the possibility that the player character is moved by passing-through movement to a place where the player character cannot be placed.

The phrase "the state of the upward-directed place in the terrain object" includes not only the state related to the inclination angle in the place but also the type of the terrain object in the place, or the state related to the space on the upper side of the place. For example, in another embodiment, when the place in the terrain object is an object (e.g., an object representing lava) that will damage the player character on the object, the game system 1 may determine that the destination condition is not satisfied. Meanwhile, for example, when the space on the upper side of the place in the terrain object is a space (e.g., under water) where the player character can stay only for a certain period of time, the game system 1 may determine that the destination condition is not satisfied. Thus, the game system 1 may not regard, as a destination, a place where the player character cannot be placed, and moreover, may exclude a specific place from destinations even though the player character can be placed on the place.

In the game space, a plurality of terrain objects may be placed in layers. In this case, a plurality of layers of terrain objects may be present above the player character. Hereinafter, a destination determining method in the case where a plurality of layers of terrain objects are present above the player character, will be described.

Figure 15:
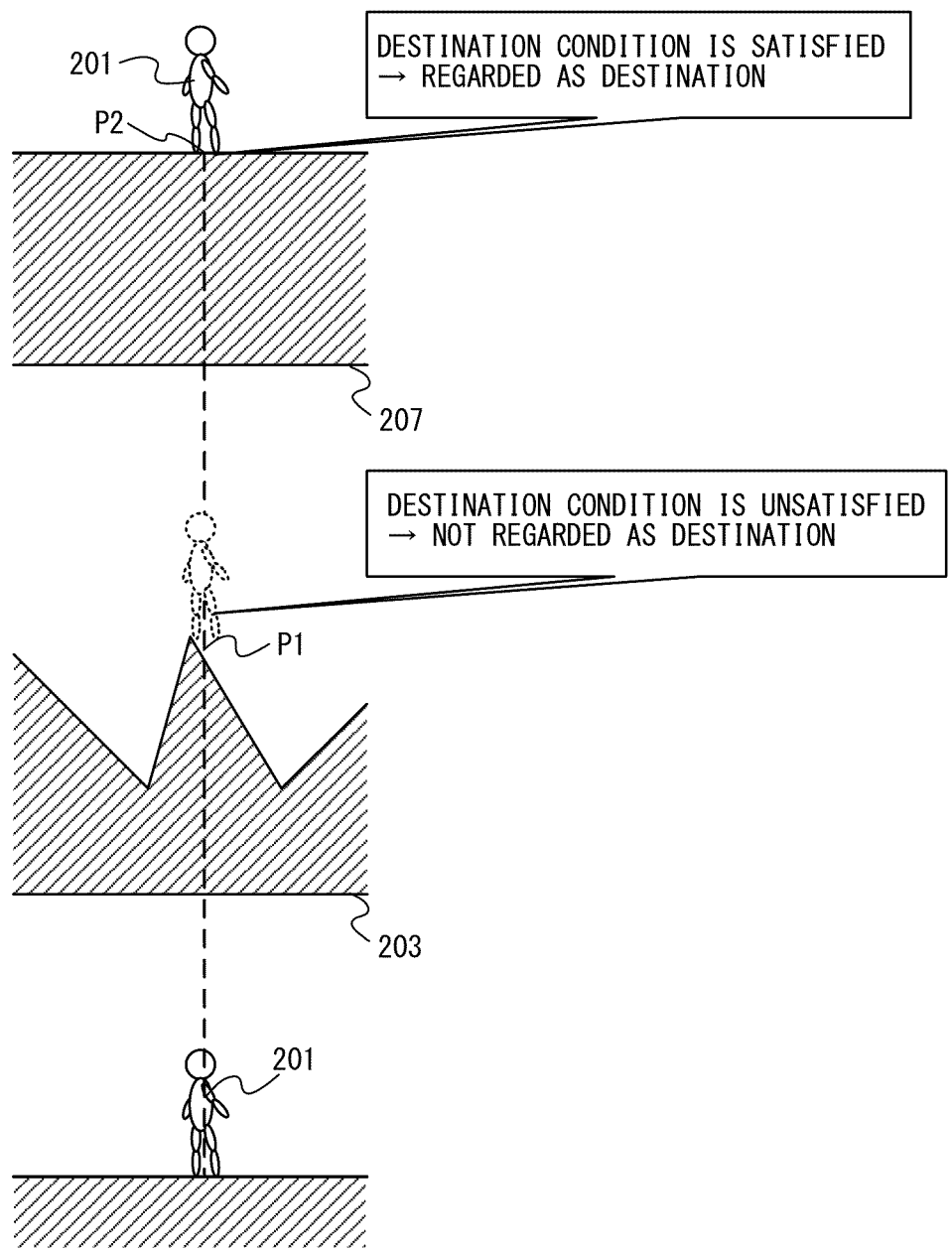
FIG. 15 shows an example of a case where a plurality of terrain objects are present above the player character.

FIG. 15 shows an example of a case where a plurality of terrain objects are present above the player character. In the example shown in FIG. 15, two terrain objects 203 and 207 are present above the player character 201. In addition, an upward-directed place P1 in the terrain object 203 located above the player character 201 and serving as a ceiling does not satisfy the destination condition, while an upward-directed place P2 in the terrain object 207 located above the terrain object 203 satisfies the destination condition.

In the example shown in FIG. 15, firstly, the game system 1 determines whether or not the destination condition is satisfied with respect to the terrain object 203 closest to the player character 201 among the terrain objects located above the player character 201. If the destination condition is not satisfied with respect to the terrain object 203, the game system 1 determines whether or not the destination condition is satisfied with respect to the terrain object 207 closest to the player character 201, except the terrain object 203, among the terrain objects located above the player character 201. In the example shown in FIG. 15, since the place P2 in the terrain object 207 satisfies the destination condition, the place P2 is determined as a destination (see FIG. 15).

As described above, when a plurality of terrain objects are present above the player character 201, the game system 1 determines whether or not the destination condition is satisfied with respect to these terrain objects in order from one closest to the player character 201. The game system 1 repeats the determination until there is a terrain object for which the destination condition is satisfied. If the destination condition is not satisfied with respect to any of the terrain objects, the game system 1 determines that the movement condition is not satisfied, and does not cause the player character 201 to perform passing-through movement. Meanwhile, if there is a terrain object for which the destination condition is satisfied, the game system 1 causes the player character 201 to perform passing-through movement to the destination terrain object. Thus, in the exemplary embodiment, a destination can be determined even when there are a plurality of terrain objects above the player character 201.

[2-3. Flow of Game Operation and Game Display Related to Passing-Through Movement]

In the exemplary embodiment, the aforementioned passing-through movement is performed by the player character 201 using a predetermined movement item. Specifically, during the game, the player firstly performs an item designating instruction to make the player character 201 able to use the movement item. In this state, the player can cause the player character 201 to perform passing-through movement by performing a movement start instruction (on condition that the movement condition is satisfied). Hereinafter, an operation of the player for causing the player character 201 to perform passing-through movement and display in the case where the passing-through movement is performed, will be described.

[2-3-1. Game Image Before Passing-Through Movement]

Figure 16:
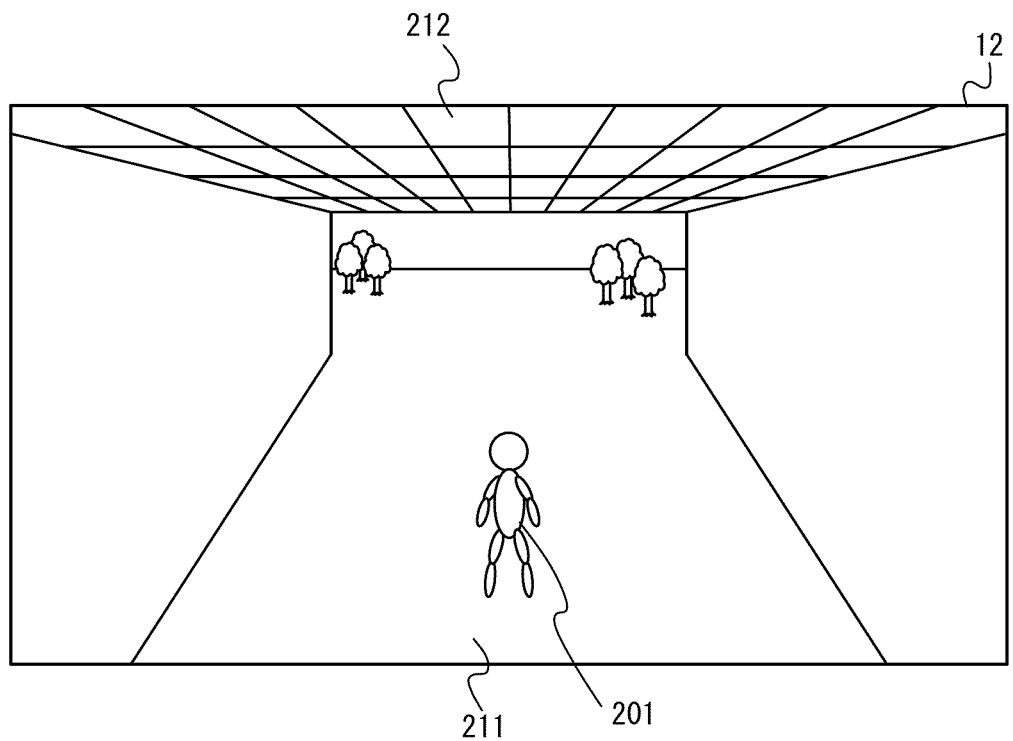
FIG. 16 shows an example of a game image in a state before a movement item becomes usable.

FIG. 16 shows an example of a game image in the state before a movement item becomes usable. As shown in FIG. 16, in this state, a game image showing a game space including a player character 201 is displayed on the display 12. That is, the game system 1 sets a virtual camera for creating the game image at a position and an orientation such that the player character 201 is included in the field of view of the virtual camera. In this state, the player can perform an operation of moving the player character 201 on a terrain object 211 representing the ground, and can perform an item designating instruction for making the player character 201 able to use the movement item.

In the above state, when the player performs an item designating instruction, the player character 201 becomes able to use the movement item. A specific operation method for performing the item designating instruction is arbitrary. For example, the game system 1 may receive, as an item designating instruction, an operation of changing, to the movement item, an item to be made usable from among a plurality of items possessed by the player character 201.

Figure 17:
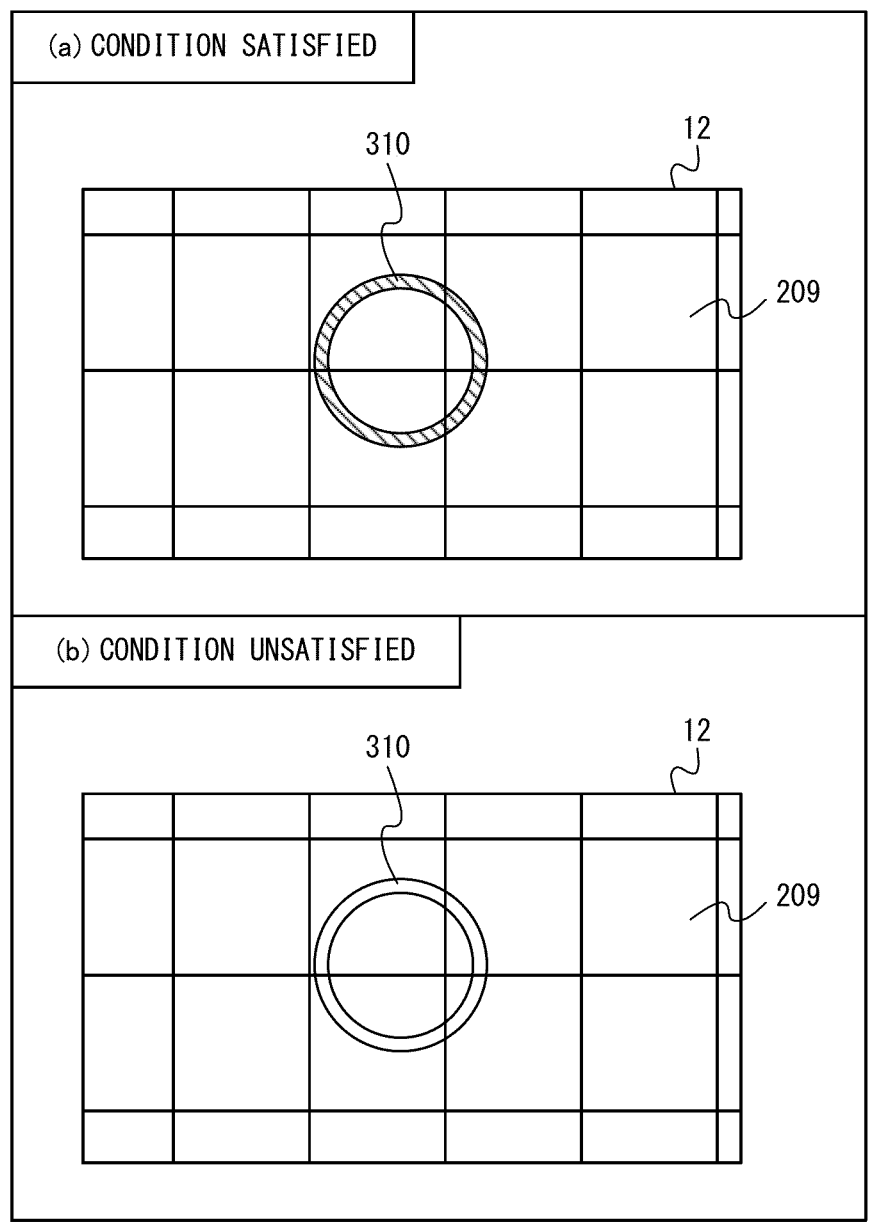
FIG. 17 shows an example of a game image that is displayed in response to an item designating instruction having been performed in the state of FIG. 16.

In the exemplary embodiment, in response to the item designating instruction having been performed, the game system 1 changes the position and orientation of the virtual camera so as to be directed upward from the position of the player character 201. FIG. 17 shows an example of a game image displayed in response to the item designating instruction having been performed in the state shown in FIG. 16. In the state shown in FIG. 16, a terrain object 212 serving as a ceiling is present above the player character 201. Therefore, when the virtual camera is directed upward in response to the item designating instruction having been performed, the terrain object 212 serving as the ceiling is displayed on the display 12 as shown in FIG. 17. In the example shown in FIG. 17, the player character 201 is not displayed. In another embodiment, a part (e.g., head) of the player character 201 may be displayed when the virtual camera is directed upward. The virtual camera may not necessarily be directed straight upward, and may be oriented such that the ceiling located above the player character 201 is included in the field of view.

The position and orientation of the virtual camera are automatically changed in response to the item designating instruction (that is, without an instruction by the player other than the item designating instruction). Thus, after performing the item designating instruction, the player can easily confirm whether or not there is a ceiling above the player character 201.

In the exemplary embodiment, in the state where the virtual camera is directed upward in response to the item designating instruction having been performed, the game system 1 receives, from the player, an operation of changing the orientation of the virtual camera. Therefore, in the above state, the player can change the line-of-sight direction of the virtual camera to any direction. In another embodiment, the virtual camera may not necessarily be directed upward automatically in response to an item designating instruction. The player may operate the virtual camera so as to be directed upward according to need.

In the exemplary embodiment, when the terrain object serving as the ceiling is displayed in response to the item designating instruction, the game system 1 displays a mark 310 representing a determination result regarding the movement condition (see FIG. 17). In the exemplary embodiment, the mark 310 is displayed on the terrain object 212 serving as the ceiling. Specifically, the mark 310 is displayed at a position above the player character 201, i.e., at a position where the determination shape is in contact with the terrain object 212. The mark 310 may not necessarily be placed on the surface of the terrain object 212, and may be placed near the surface of the terrain object 212 (e.g., at a position a little apart from the surface).

If the item designating instruction is performed in the state where the terrain object serving as the ceiling is not present within a predetermined distance upward from the player character 201 (i.e., in the state where the height condition is not satisfied), the mark 310 is placed at a predetermined position above the player character 201. This predetermined position is, for example, a position the predetermined distance apart from the player character 201.

The mark 310 is displayed in different display modes between the case where the movement condition is satisfied and the case where it is not satisfied. In the exemplary embodiment, the color of the mark 310 differs between the former case and the latter case (see (a) and (b) of FIG. 17). In FIG. 17, the difference in the color of the mark 310 is indicated by presence/absence of hatching.

As described above, in the exemplary embodiment, display representing the determination result regarding the movement condition is performed by rendering a part (e.g., the mark 310) in which the terrain object is in contact with the determination shape, in different display modes according to the determination result. This allows the player to easily confirm whether or not the destination condition is satisfied (i.e., whether or not passing-through movement is possible). The phrase "rendering the part in different display modes according to the determination result" includes the meaning that a mark is displayed at the part as for one determination result while no mark is displayed at the part as for the other determination result.

In the exemplary embodiment, a display (specifically, the mark 310) representing the determination result regarding the movement condition is placed on the terrain object serving as the ceiling. Here, the position of the display representing the determination result regarding the movement condition is arbitrary. For example, in another embodiment, the position of the display representing the determination result regarding the movement condition may be the position where the determination shape is placed. For example, in a modification of the exemplary embodiment, the rays 301 to 306 may be displayed in different display modes according to the determination result. Thus, in the exemplary embodiment or the modification, the display representing the determination result regarding the movement condition is performed in at least one of: the part where the terrain object is in contact with the determination shape; and the position where the determination shape is placed. Thus, the position of the ceiling to be subjected to determination regarding the movement condition is displayed in association with the result of the determination, whereby both of them can be presented in an easy-to-understand manner for the player.

In another embodiment, in the state where the movement item is usable (e.g., the state where the game image shown in FIG. 17 is displayed), the game system 1 may receive an operation for causing the player character 201 to move on the terrain object 211. Thus, by causing the player character 201 to move, the player can easily search for the position of the player character 201 where passing-through movement is possible.

[2-3-2. Creation of Game Image at Passing-Through Movement]

In the state where the movement item is usable, the game system 1 receives a movement start instruction of starting passing-through movement by using the movement item, and a cancellation instruction of canceling this state. When the movement start instruction has been performed by the player, the game system 1 starts a motion control process of causing the player character 201 to perform passing-through movement (i.e., a passing-through movement process in step S13 shown in FIG. 20), on condition that the movement condition is satisfied. Meanwhile, when the cancellation instruction has been performed by the player, the game system 1 returns the position and orientation of the virtual camera to those before the item designating instruction. Thus, the game image showing the game space including the player character 201 as shown in FIG. 16 is displayed on the display 12.

In the motion control process of causing the player character 201 to perform passing-through movement, firstly, the game system 1 moves the player character 201 upward. When the passing-through movement is performed, the game system 1 may display a columnar effect image extending upward from the position of the player character 201, and may control the player character 201 so as to move upward inside the columnar effect image. The effect image may be translucently displayed so that the player character 201 located inside is visible. With the effect image, the path in which the player character 201 moves can be presented in an easy-to-understand manner for the player. The effect image may be displayed only when the player character 201 is located outside the terrain object, or may be displayed in both cases where the player character 201 is located outside the terrain object and where it is located inside the terrain object.

While the player character 201 is moved upward, the player character 201 comes into contact with the terrain object 212 serving as the ceiling. In the motion control process, the upward movement of the player character 201 is continued even after the contact, and as a result, the player character 201 moves upward inside the terrain object 212. In a normal process (i.e., a process other than the motion control process), a collision determination process is performed between the player character 201 and the terrain object 212, so that the player character 201 does not enter the terrain object 212.

Figure 18:
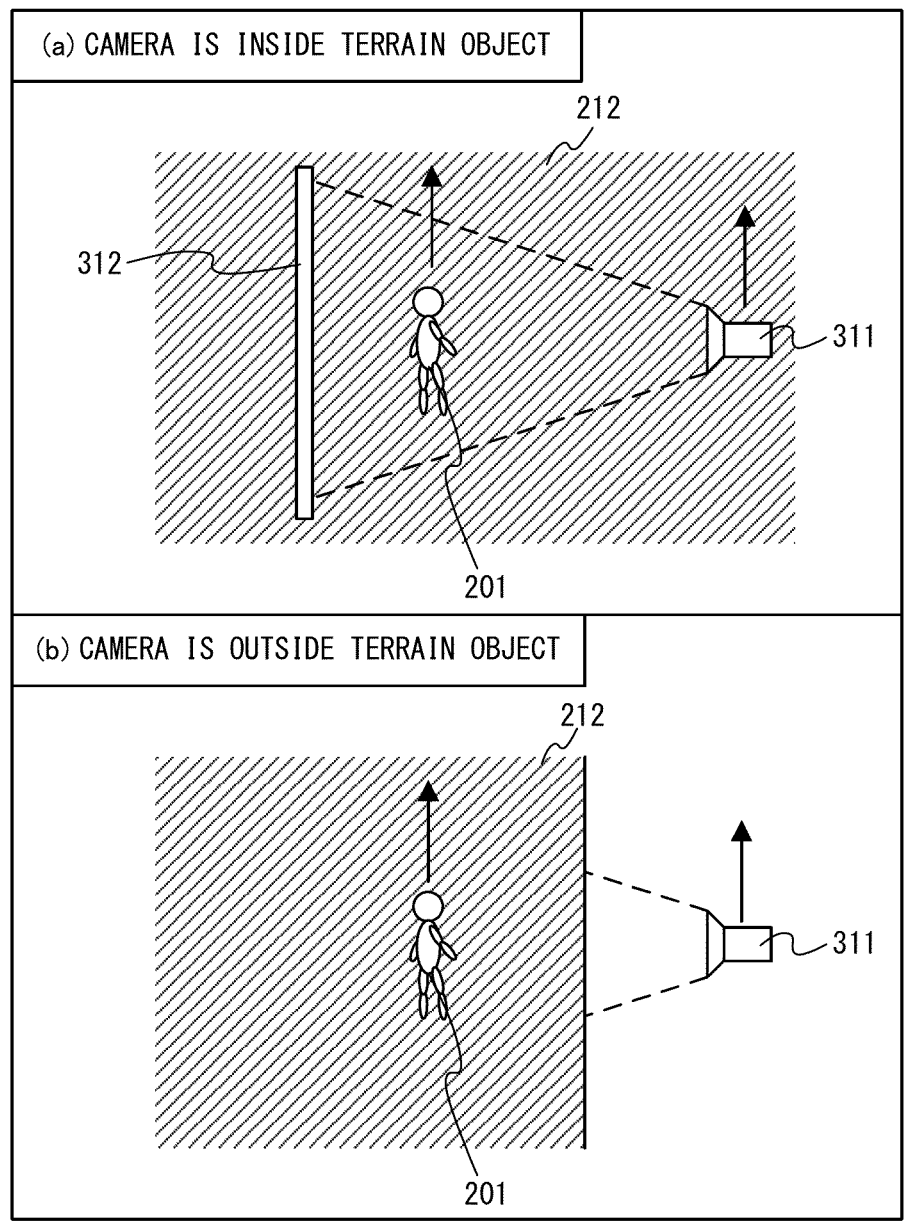
FIG. 18 shows an example of placement of a player character and a virtual camera in a case where the player character moves inside a terrain object.

FIG. 18 shows an example of placement of a player character and a virtual camera in the case where the player character moves inside a terrain object. In the exemplary embodiment, during the passing-through movement, the game system 1 places a virtual camera 311 at a position and an orientation that allow the player character 201 to be included in the field of view of the virtual camera 311. For example, the virtual camera 311 is placed at the same position as the player character 201 with respect to the up-down direction and is directed in the horizontal direction (see FIG. 18). At this time, the virtual camera 311 is placed at a position a predetermined distance apart from the player character 201. Since the player character 201 moves upward during the passing-through movement, the virtual camera 311 also moves upward with the movement of the player character 201.

During the passing-through movement, the virtual camera 311 may be placed inside the terrain object 212 (see (a) of FIG. 18). In this case, the game system 1 places a background object 312 behind the player character 201 as seen from the virtual camera 311. In the exemplary embodiment, the background object 312 has a size that can cover the field of view of the virtual camera 311, and is placed at a position so as to cover the field of view of the virtual camera 311 (i.e., so that the terrain object 212 behind the background object 312 is not displayed) (see (a) of FIG. 18). Therefore, in this case, the player character 201 and the background object 312 behind the player character 201 are displayed on the display 12 while the terrain object 212 (strictly speaking, a polygon on the surface of the terrain object 212) is not displayed. A texture rendered on the background object 312 is arbitrary. For example, an image representing a scene in which the player character 201 moves underground or an image representing a scene in which the player character 201 moves by space warp, is rendered on the background object 312.

As described above, in the exemplary embodiment, during the passing-through movement, the background object is displayed if the virtual camera 311 is placed inside the terrain object. Thus, it is possible to avoid inconvenience that may occur if the display process is performed from a viewpoint on the back side (in other words, from the inside) of the polygon on the terrain object 212. For example, the back side of the polygon is not rendered in many cases, which may cause a problem that the terrain object 212 is partially displayed or is not displayed and thereby the appearance thereof is deformed. Even if the back side of the polygon is rendered, the appearance is still unnatural because the back side of an object is usually not displayed. In contrast, use of the background object 312 can reduce unnaturalness of the appearance.

On the other hand, during the passing-through movement, if the virtual camera 311 is placed outside the terrain object 212, the background object 312 is not placed (see (b) of FIG. 18). In this case, a game image showing a game space in which the terrain object 212 is viewed from the outside (e.g., a game image showing the side wall of the terrain object 212) is displayed. In this case, the player character 201 is not displayed. However, in another embodiment, in the above case, the game system 1 may display the player character 201 inside the terrain object 212 so as to be translucent and overlapped with the terrain object 212, or may display the terrain object 212 so as to be translucent so that the player character 201 can be seen through. In another embodiment, even if the virtual camera 311 is placed outside the terrain object 212, the background object 312 may be placed as in the case where the virtual camera 311 is placed inside the terrain object 212. At this time, the game system 1 does not display the surface of the terrain object 212 (specifically, the polygon on the terrain object 212) located between the virtual camera 311 and the player character 201.

The content of the game image representing the player character 201 passing through the terrain object during the passing-through movement is arbitrary. In another embodiment, the game image may be created and displayed by a method different from that for the exemplary embodiment.

As described above, in the exemplary embodiment, the game system 1 moves the player character 201 upward from the current position, and further moves the player character 201 so as to pass through the terrain object from the ceiling, thereby moving the player character 201 to the destination. This allows the player to intuitively recognize that the player character 201 passes through the terrain object when moving from the current position to the destination on the upper side of the terrain object.

In another embodiment, when moving the player character 201 to the destination by the passing-through movement, the game system 1 may not necessarily display an animation showing the player character 201 passing through the terrain object. For example, the game system 1 may display an animation showing the player character 201 moving by space warp to the destination from the position before the movement.

In the exemplary embodiment, when moving the player character 201 to the destination by the passing-through movement, the game system 1 displays different animations between the case where the player character 201 moves inside the terrain object and the case where the player character 201 moves outside the terrain object. For example, when the player character 201 moves inside the terrain object, the game system 1 displays an animation including the background object or an animation showing the side wall of the terrain object. This allows the player to easily recognize that the player character 201 moves inside the terrain object.

In the exemplary embodiment, as an animation showing movement of the player character 201 in the case where the player character 201 is moved to the destination by the passing-through movement, the game system 1 creates an animation different from an animation showing the player character 201 moving on the terrain object (e.g., an animation showing the player character 201 walking or running on the terrain object). For example, the game system 1 causes the player character 201 during the passing-through movement to take a posture of jumping up or a posture of swimming upward. This allows the player to easily recognize that movement (i.e., passing-through movement) different from the normal movement of the player character 201 on the terrain object is performed.

If the distance from the movement start position to the destination in the passing-through movement is longer than a predetermined reference distance, the game system 1 may increase the moving speed of the player character 201. Thus, the time required for the passing-through movement can be reduced if the time seems to be long.

When the player character 201 has arrived at the destination by the passing-through movement, the game system 1 ends the motion control process of causing the player character 201 to perform passing-through movement. In the exemplary embodiment, when the passing-through movement has ended, the state in which the player character 201 can use the movement item is canceled automatically (i.e., without an operation of the player). Thus, the player can perform a movement operation or the like on the player character 201 without performing the aforementioned cancellation instruction. In another embodiment, when the passing-through movement has ended, the game system 1 may maintain the state where the player character 201 can use the movement item.

In the exemplary embodiment, while the passing-through movement is performed, the game system 1 does not receive an operation of the player on the player character 201. Thus, the player character 201 is prevented from being moved to a position different from the destination specified when the item designating instruction was performed. In another embodiment, the game system 1 may receive an operation of the player on the player character 201 even while the passing-through movement is performed. Alternatively, the game system 1 may receive an operation (e.g., an operation of causing the player character to use another item) other than the operation of moving the player character 201 while the passing-through movement is performed.

As described above, in the exemplary embodiment, according to a first instruction (e.g., item designating instruction) by an operation input performed by the player, the game system 1 performs: determination as to whether or not a determination condition (e.g., movement condition) that a terrain object serving as a ceiling is present within a predetermined distance upward from a player character and that a destination located on the terrain object is present above the ceiling located above the player character, is satisfied; and display of a result of the determination (e.g., display of the mark 310). Then, if the determination condition is satisfied, the game system 1 moves the player character to the destination, in response to a second instruction (e.g., movement start instruction) by an operation input performed by the player. Thus, the player can perform the second instruction of actually starting passing-through movement after confirming whether or not the passing-through movement is possible. Therefore, it is possible to reduce the possibility that the player performs the second instruction when the passing-through movement is not possible, thereby enhancing operability for the passing-through movement.

In the exemplary embodiment, the player character performs the passing-through movement by using the movement item. In another embodiment, use of a specific item such as the movement item may not necessarily be a condition for the passing-through movement. That is, in the another embodiment, the player character may be able to perform the passing-through movement regardless of whether or not the player character has the specific item.

3. Specific Example of Processing in Game System

Next, a specific example of information processing in the game system 1 will be described with reference to FIGS. 19 to 21.

Figure 19:
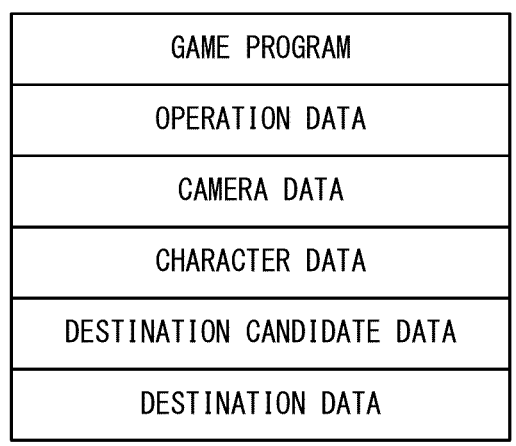
FIG. 19 shows an example of various data used for information processing in a non-limiting game system.

FIG. 19 shows an example of various data to be used for the information processing in the game system 1. The various data shown in FIG. 19 are stored in a storage medium (e.g., the flash memory 84, the DRAM 85, and/or a memory card attached to the slot 23) that is accessible by the main body apparatus 2.

The game system 1 stores therein a game program as shown in FIG. 19. The game program is a game program for executing a game (specifically, a game control process shown in FIG. 20) according to the exemplary embodiment. The game system 1 stores therein operation data, camera data, character data, destination candidate data, and destination data.

The operation data is transmitted from the controllers 3 and 4 to the main body apparatus 2 and stored in the main body apparatus 2 as described above. In the exemplary embodiment, the operation data includes input data indicating inputs to the respective input sections described above. The camera data indicates information regarding a virtual camera set in a virtual game space (e.g., information indicating the position, the orientation, etc., of the virtual camera). The character data indicates information regarding a player character placed in the game space (e.g., the position, the orientation, the state, etc., of the player character). The destination candidate data indicates candidates for a destination in the game space, specifically, the positions (e.g., coordinates) of the candidates. The destination data indicates a destination in the game space, specifically, the position (e.g., coordinates) of the destination.

Figure 20:
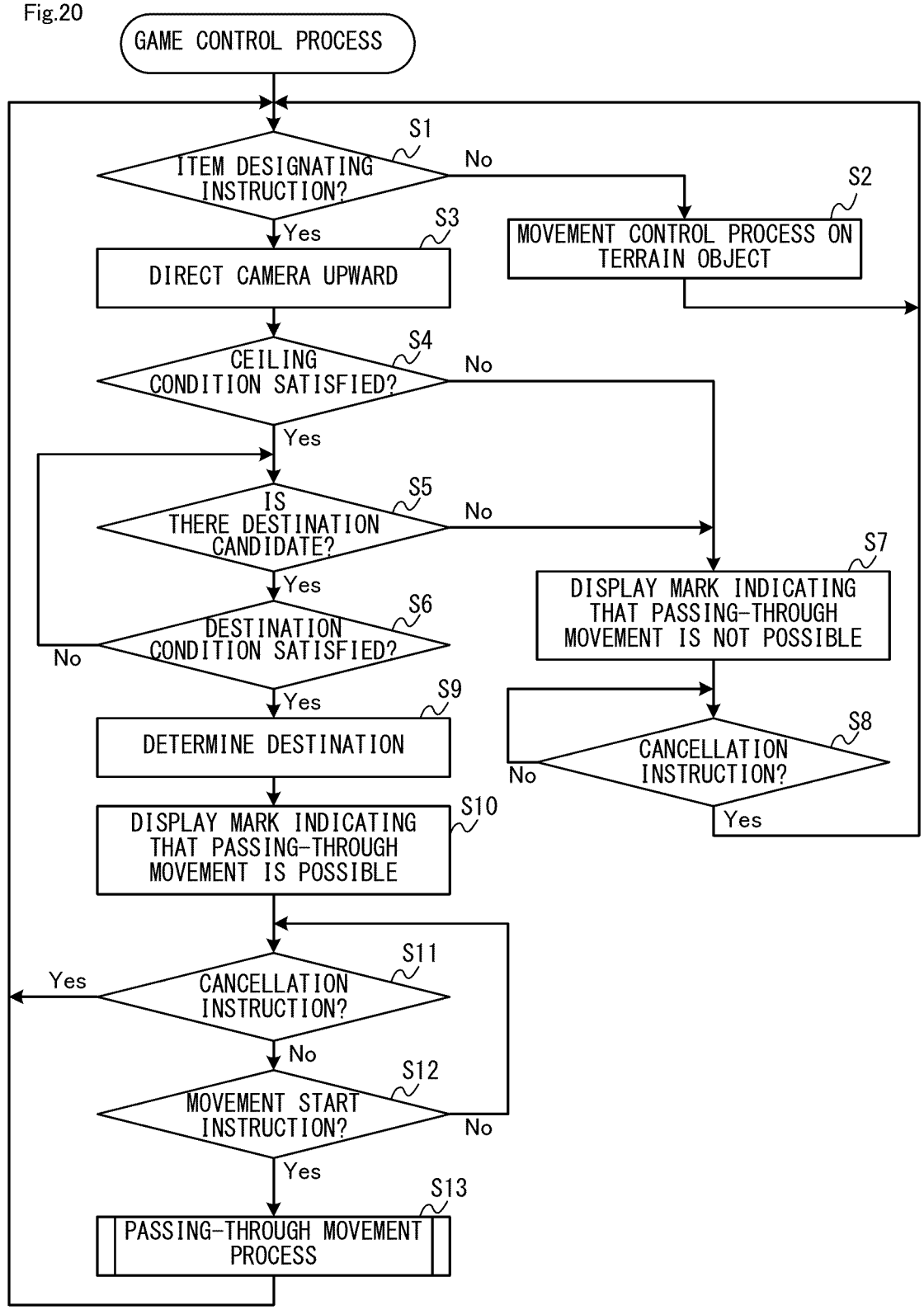
FIG. 20 is a flowchart showing an example of a flow of a game control process executed by the non-limiting game system.

FIG. 20 is a flowchart showing an example of a flow of a game control process executed by the game system 1. The game control process shown in FIG. 20 is started in response to that the player character 201 is placed in the game space during execution of the game program. Although not shown in FIG. 20, the game control process is ended when a menu screen is displayed by an instruction of the user or when the game is ended by an instruction of the user.

In the exemplary embodiment, the processor 81 of the main body apparatus 2 executes the game program stored in the game system 1, thereby executing processes in steps shown in FIG. 20. However, in another embodiment, a part of the processes in the steps may be executed by a processor (e.g., a dedicated circuit or the like) other than the processor 81. If the game system 1 is communicable with another information processing apparatus (e.g., a server), a part of the processes in the steps shown in FIGS. 20 and 21 may be executed by the information processing apparatus. The processes in the steps shown in FIGS. 20 and 21 are merely examples, and the processing order of the steps may be changed or other processes may be executed in addition to (or instead of) the processes in the steps, so long as similar results can be obtained.

The processor 81 executes the processes in the steps shown in FIGS. 20 and 21 by using a memory (e.g., the DRAM 85). That is, the processor 81 stores, in the memory, information (in other words, data) obtained in each process step, and reads out the information from the memory when using the information in the subsequent process steps.

In step S1 shown in FIG. 20, the processor 81 determines whether or not an item designating instruction as described above has been performed by the player. In the exemplary embodiment, the processor 81 determines whether or not various instructions (e.g., an item designating instruction, a cancellation instruction, and a movement start instruction) have been performed by the player, based on the operation data acquired from the controller 3 or 4. Here, the processor 81 acquires, at appropriate timing, the operation data received from each controller via the controller communication section 83 and/or the terminals 17 and 21, and stores the operation data in the memory. The processor 81 performs the aforementioned determination, based on the acquired operation data. When the determination result in step S1 is negative, the process in step S2 is executed. When the determination result in step S1 is positive, the process in step S3 is executed.

In step S2, the processor 81 executes a control process of causing a player character to move on a terrain object. For example, the processor 81 causes the player character to perform a motion of moving (e.g., a motion of walking or running) on the terrain object, in response to a direction input to the controller (e.g., a direction input to the analog stick 32). At this time, the processor 81 updates the character data stored in the memory so as to indicate the content of the motion of the player character after the control. Moreover, in step S2, the processor 81 creates a game image showing a game space after the control process, and displays the game image on the display 12. The process in step S2 may be the same as the conventional game control process. The game system 1 may execute a process of controlling movements of other objects such as a virtual camera, an enemy object, etc., in addition to executing the process of controlling the movement of the player character. Next to step S2, the process in step S1 is executed again.

A process loop of steps S1 and S2 is executed once every predetermined time (e.g., every frame time). That is, in the exemplary embodiment, the processor 81 determines whether or not an item designating instruction has been performed, once every predetermined time.

In step S3, the processor 81 sets the position and orientation of the virtual camera so that the virtual cameral is directed upward from the position of the player character. Specifically, the processor 81 updates the camera data stored in the memory so that the content of the camera data indicates the set position and orientation. The process in step S3 causes a game image showing a ceiling above the player character (see FIG. 17) to be displayed in step S7 or S10 described later. Next to step S3, the process in step S4 is executed.

In step S4, the processor 81 determines whether or not the aforementioned ceiling condition is satisfied with respect to the current position of the player character. This determination is performed according to the method described in the above "[2-2-1. Ceiling condition]". When the determination result in step S4 is positive, the process in step S5 is executed. When the determination result in step S4 is negative, the process in step S7 described later is executed.

In step S5, the processor 81 determines whether or not there is a destination candidate. Here, the destination candidate is a place located closest to the player character among upward-directed places in terrain objects serving as ceilings located above the player character, excluding a place determined not to satisfy the destination condition in step S6 described later. When there is such a place, the processor 81 sets this place as a destination candidate. That is, the processor 81 stores, in the memory, data indicating the position of the place as destination candidate data. When the determination result in step S5 is positive, the process in step S6 is executed. When the determination result in step S5 is negative, the process in step S7 described later is executed.

In step S6, the processor 81 determines whether or not the destination candidate set in step S5 satisfies the aforementioned destination condition. This determination is performed according to the method described in the above "[2-2-2. Destination condition]". When the determination result in step S6 is positive, the process in step S7 is executed. When the determination result in step S6 is negative, the process in step S5 is executed again. Therefore, in the exemplary embodiment, a process loop of steps S5 and S6 is repeated until it is determined that a destination candidate satisfies the destination condition or until it is determined that none of destination candidates satisfy the destination condition.

In step S7, the processor 81 displays, on the display 12, a game image in a display mode indicating that passing-through movement is not possible. At this time, the processor 81 creates the game image, based on the virtual camera set through the process in step S3. Specifically, the processor 81 creates the game image showing a game space as seen in a direction according to the orientation of the virtual camera from the position of the virtual camera. At this time, the processor 81 includes, in the game image, a mark in a display mode indicating passing-through movement is not possible (see (b) of FIG. 17). The game image created as described above is displayed on the display 12. Next to step S7, the process in step S8 is executed.

In step S8, the processor 81 determines whether or not a cancellation instruction as described above has been performed by the player. When the determination result in step S8 is positive, the process in step S1 is executed again. When the determination result in step S8 is negative, the process in step S8 is executed again. That is, in the exemplary embodiment, after the game image has been displayed in step S7, the processor 81 waits until the cancellation instruction is performed, and executes the process in step S1 again when the cancellation instruction is performed.

Meanwhile, in step S9, the processor 81 determines, as a destination of passing-through movement, a destination candidate that has been determined to satisfy the destination condition. That is, the processor 81 updates the content of the destination data stored in the memory to the content stored as the destination candidate data. Next to step S9, the process in step S10 is executed.

In step S10, the processor 81 displays, on the display 12, a game image in a display mode indicating that passing-through movement is possible. At this time, the processor 81 creates the game image, based on the virtual camera as in the process in step S7. Moreover, in step S10, the processor 81 includes, in the game image, a mark in a display mode indicating that passing-through movement is possible (see (a) of FIG. 17). The game image created as described above is displayed on the display 12. Next to step S10, the process in step S11 is executed.

In step S11, the processor 81 determines whether or not a cancellation instruction as described above has been performed by the player. When the determination result in step S11 is positive, the process in step S1 is executed again. That is, in this case, passing-through movement of the player character is not performed, and the state of the game is returned to the state before the item designating instruction. Meanwhile, when the determination result in step S11 is negative, the process in step S12 is executed.

In step S12, the processor 81 determines whether or not a movement start instruction as described above has been performed by the player. When the determination result in step S12 is positive, the process in step S13 is executed. When the determination result in step S12 is negative, the process in step S11 is executed again. That is, after the process in step S10, the processor 81 waits until a cancellation instruction or a movement start instruction is performed.

In step S13, the processor 81 executes a passing-through movement process. The passing-through movement process is a motion control process of causing the player character to perform a motion for passing-through movement. The passing-through movement process will be described later in detail. When the passing-through movement process has ended, the process in step S1 is executed again.

FIG. 21 is a sub-flowchart showing an example of a specific flow of the passing-through movement process in step S13 shown in FIG. 20. In the passing-through movement process, firstly in step S21, the processor 81 moves the player character upward. Specifically, the processor 81 updates the character data stored in the memory so that the character data indicate a position to which the player character is moved upward from the current position. In the passing-through movement process of the exemplary embodiment, a process loop including a series of processes in steps S21 to S26 is repeatedly executed once every predetermined time (e.g., every frame time). Therefore, in the process of each step S21, the player character is moved by an amount of movement within the predetermined time. Next to step S21, the process in step S22 is executed.

In step S22, the processor 81 places the virtual camera in accordance with the position of the player character. Specifically, the processor 81 places the virtual camera at a position and an orientation that allow the player character to be included in the field of view of the virtual camera, based on the position of the player character having been moved in the process of step S21. At this time, the processor 81 updates the camera data stored in the memory so that the camera data indicates the position after the placement described above. In the exemplary embodiment, since the player character is moved upward by the process in step S21, the virtual camera is also moved upward with the player character. Next to step S22, the process in step S23 is executed.

In step S23, the processor 81 determines whether or not the position of the virtual camera placed by the process in step S22 is a position inside the terrain object. This determination is performed based on the camera data stored in the memory and on data that is created based on the game program and indicates the configuration of the game space (this data includes data indicating the position of the terrain object). When the determination result in step S23 is positive, the process in step S24 is executed. When the determination result in step S23 is negative, the process in step S24 is skipped and the process in step S25 is executed.

In step S24, the processor 81 places a background object behind the player character as seen from the virtual camera (see (a) of FIG. 18). Specifically, the processor 81 places the background object in the terrain object according to the method described in the above "[2-3-2. Creation of game image at passing-through movement]". Next to step S24, the process in step S25 is executed.

In step S25, the processor 81 displays, on the display 12, a game image showing the player character performing passing-through movement. As described above, the process loop including the series of processes in steps S21 to S26 is repeatedly executed once every predetermined time (e.g., every frame time), and therefore, the process in step S25 is also executed once every predetermined time. Therefore, the process loop being repeatedly executed causes an animation in which the player character performs passing-through movement to be displayed. Next to step S25, the process in step S26 is executed.

In step S26, the processor 81 determines whether or not the player character has arrived at the destination. This determination can be performed based on the position of the player character indicated by the character data stored in the memory and on the position indicated by the destination data. When the determination result in step S26 is positive, the processor 81 ends the passing-through movement process. When the determination result in step S26 is negative, the process in step S21 is executed again. Thereafter, the process loop of steps S21 to S26 is repeatedly executed until it is determined that the player character has arrived at the destination.

4. Function and Effect of Exemplary Embodiment, and Modifications

As described above, in the above exemplary embodiment, the game program causes a computer (e.g., the processor 81) of an information processing apparatus (e.g., the main body apparatus 2) to execute processes as follows:
a normal movement control including at least a control of, in a virtual space including at least a player character and a terrain object, moving the player character on the terrain object, based on an operation input performed by a player; and
a special movement control of moving the player character to a destination, based on an operation input (e.g., a movement start instruction) performed by the player, if it is at least satisfied that a terrain object serving as a ceiling is present above the player character and that the destination, on the terrain object, at which the player character is placeable is present above the ceiling located above the player character.

In the above configuration, if the terrain object is present above the player character, the player character can be moved to an upper side of the terrain object, based on the operation input performed by the player. Thus, according to the exemplary embodiment, it is possible to provide a novel method for moving the player character in the game space.

(Modifications Related to Movement Condition)

In the above exemplary embodiment, a condition regarding a distance (specifically, a height) from the current position of the player character is not set with respect to a destination. In another embodiment, the game system 1 may set, with respect to a destination, a condition regarding the distance from the position of the player character. Specifically, the destination condition may include a height condition that "a distance from the position of a player character to a destination is within a predetermined distance". The predetermined distance is set to a value greater than a threshold value of the height condition included in the ceiling condition. Thus, it is possible to reduce the possibility that the player character is moved to a place far above the current position by passing-through movement.

In another embodiment, the height condition regarding the height from the player character to the ceiling may not necessarily be set as the ceiling condition included in the movement condition. That is, if there is no place to be excluded, such as the place far above, in the game, a height limit need not be set. Alternatively, the height limit in the height condition may be set to an infinite or sufficient height, which means that there is substantially no height limit.

(Modifications Related to Display when Passing-Through Movement is Performed)

In another embodiment, the game system 1 may display a game image showing the game space around the destination before the player performs the movement start instruction. This allows the player to confirm the state of the destination before causing the player character to perform passing-through movement. For example, in the state where the game image showing the ceiling (see FIG. 17) is displayed according to the item designating instruction, the game system 1 may receive, from the player, an instruction of displaying the game image of the destination. When this instruction has been performed, the game system 1 may display the game image of the destination, on the condition that the movement condition is satisfied.

In another embodiment, the information processing system may not necessarily include a part of the components included in the exemplary embodiment, and may not necessarily perform a part of the processes performed in the exemplary embodiment. For example, in order to achieve a certain specific effect of the exemplary embodiment, the information processing system may include a component for producing the effect and perform a process for producing the effect, in other words, the information processing system may not necessarily include the other components and perform the other processes.

The exemplary embodiment is usable as, for example, a game program and a game system for the purpose of, when a terrain object is present above a player character, moving the player character to an upper side of the terrain object.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein a game program executable by a processor of an information processing apparatus, wherein the game program, when executed by the processor, causes the information processing apparatus to provide execution comprising:
    moving a player character, on a terrain object in a virtual space, based on a first operation input;
    moving the player character, so as to pass through the terrain object in the virtual space, based on a second operation input; and
    in association with the player character moving within the terrain object in the virtual space and a virtual camera being placed inside the terrain object, placing and rendering a background object in the virtual space.

2. The non-transitory computer-readable storage medium according to claim 1, wherein the player character is moved so as to pass through a ceiling part of the terrain object.

3. The non-transitory computer-readable storage medium according to claim 1, wherein the player character is moved so as to pass through the terrain object based on satisfying a movement condition.

4. The non-transitory computer-readable storage medium according to claim 1, wherein
    a first animation is displayed in association with the player character moving inside the terrain object, and
    a second animation, different from the first animation, is displayed in association with the player character moving outside the terrain object.

5. The non-transitory computer-readable storage medium according to claim 1, wherein the background object is not placed in the virtual space when the virtual camera is not inside the terrain object.

6. The non-transitory computer-readable storage medium according to claim 1, wherein the background object is placed behind the player character as seen from the virtual camera.

7. The non-transitory computer-readable storage medium according to claim 1, wherein the background object is of a size covering a field of view of the virtual camera, and the background object is placed at a position so as to cover the field of view of the virtual camera.

8. An information processing apparatus, comprising:
    an input portion; and
    processing circuitry including at least one processor, wherein the processing circuitry is configured to:
        move a player character, on a terrain object in a virtual space, based on a first operation input from the input portion;
        move the player character, so as to pass through the terrain object in the virtual space, based on a second operation input from the input portion; and
        in association with the player character moving within the terrain object in the virtual space and a virtual camera being placed inside the terrain object, place and render a background object in the virtual space.

9. The information processing apparatus according to claim 8, wherein the player character is moved so as to pass through a ceiling part of the terrain object.

10. The information processing apparatus according to claim 8, wherein the player character is moved so as to pass through the terrain object based on satisfying a movement condition.

11. The information processing apparatus according to claim 8, wherein
  a first animation is displayed in association with the player character moving inside the terrain object, and
  a second animation, different from the first animation, is displayed in association with the player character moving outside the terrain object.

12. The information processing apparatus according to claim 8, wherein the background object is not placed in the virtual space when the virtual camera is not inside the terrain object.

13. The information processing apparatus according to claim 8, wherein the background object is placed behind the player character as seen from the virtual camera.

14. The information processing apparatus according to claim 8, wherein the background object is of a size covering a field of view of the virtual camera, and the background object is placed at a position so as to cover the field of view of the virtual camera.

15. An information processing system, comprising:
  a processor; and
  a memory configured to store computer readable instructions that, when executed by the processor, cause the information processing system to:
    move a player character, on a terrain object in a virtual space, based on a first operation input;
    move the player character, so as to pass through the terrain object in the virtual space, based on a second operation input; and
    in association with the player character moving within the terrain object in the virtual space and a virtual camera being placed inside the terrain object, place and render a background object in the virtual space.

16. The information processing system according to claim 15, wherein the player character is moved so as to pass through a ceiling part of the terrain object.

17. The information processing system according to claim 15, wherein the player character is moved so as to pass through the terrain object based on satisfying a movement condition.

18. The information processing system according to claim 15, wherein
  a first animation is displayed in association with the player character moving inside the terrain object, and
  a second animation, different from the first animation, is displayed in association with the player character moving outside the terrain object.

19. The information processing system according to claim 15, wherein the background object is not placed in the virtual space when the virtual camera is not inside the terrain object.

20. The information processing system according to claim 15, wherein the background object is placed behind the player character as seen from the virtual camera.

21. The information processing system according to claim 15, wherein the background object is of a size covering a field of view of the virtual camera, and the background object is placed at a position so as to cover the field of view of the virtual camera.

22. A game processing method executed by an information processing system, the method comprising:
  moving a player character, on a terrain object in a virtual space, based on a first operation input;
  moving the player character, so as to pass through the terrain object in the virtual space, based on a second operation input; and
  in association with the player character moving within the terrain object in the virtual space and a virtual camera being placed inside the terrain object, placing and rendering a background object in the virtual space.

23. The game processing method according to claim 22, wherein the player character is moved so as to pass through a ceiling part of the terrain object.

24. The game processing method according to claim 22, wherein the player character is moved so as to pass through the terrain object based on satisfying a movement condition.

25. The game processing method according to claim 22, wherein
  a first animation is displayed in association with the player character moving inside the terrain object, and
  a second animation, different from the first animation, is displayed in association with the player character moving outside the terrain object.

26. The game processing method according to claim 22, wherein the background object is not placed in the virtual space when the virtual camera is not inside the terrain object.

27. The game processing method according to claim 22, wherein the background object is placed behind the player character as seen from the virtual camera.

28. The game processing method according to claim 22, wherein the background object is of a size covering a field of view of the virtual camera, and the background object is placed at a position so as to cover the field of view of the virtual camera.

* * * * *